US007879444B2

(12) United States Patent
Jiang et al.

(10) Patent No.: US 7,879,444 B2
(45) Date of Patent: Feb. 1, 2011

(54) SUPER-LOW FOULING SULFOBETAINE AND CARBOXYBETAINE MATERIALS AND RELATED METHODS

(75) Inventors: Shaoyi Jiang, Redmond, WA (US); Shengfu Chen, Hangzhou (CN); Zheng Zhang, Cambridge, MA (US); Yung Chang, Taoyuan (TW)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 12/020,998

(22) Filed: Jan. 28, 2008

(65) Prior Publication Data

US 2008/0181861 A1    Jul. 31, 2008

Related U.S. Application Data

(63) Continuation of application No. PCT/US2006/028988, filed on Jul. 25, 2006.

(60) Provisional application No. 60/711,613, filed on Aug. 25, 2005.

(51) Int. Cl.
*B32B 5/16* (2006.01)
*B32B 27/38* (2006.01)
*B32B 27/40* (2006.01)
*B32B 27/34* (2006.01)
*B32B 27/36* (2006.01)

(52) U.S. Cl. .................... 428/411.1; 428/403; 428/413; 428/423.1; 428/474.4; 428/480; 428/500

(58) Field of Classification Search ....................... None
See application file for complete search history.

(56) References Cited

U.S. PATENT DOCUMENTS

| | | | |
|---|---|---|---|
| 3,671,502 A * | 6/1972 | Samour et al. | ............... 526/287 |
| 5,919,523 A | 7/1999 | Sundberg | |
| 7,291,427 B2 | 11/2007 | Kawamura | |
| 7,306,625 B1 | 12/2007 | Stratford et al. | |

FOREIGN PATENT DOCUMENTS

| | | |
|---|---|---|
| EP | 0354984 A2 | 2/1990 |
| EP | 0479245 A2 | 4/1992 |
| WO | 0039176 A1 | 7/2000 |
| WO | 2004058837 A2 | 7/2004 |
| WO | 2004100666 A1 | 11/2004 |

OTHER PUBLICATIONS

Chang, Y., et al., "Highly Protein-Resistant Coatings From Well-Defined Diblock Copolymers Containing Sulfobetaines," Langmuir 22(5):2222-2226, 2006.
Chen, S., et al., "Controlling Antibody Orientation on Charged Self-Assembled Monolayers," Langmuir 19(7):2859-2864, 2003.
Chen, S., et al., "Strong Resistance of Oligo(phosphorylcholine) Self-Assembled Monolayers to Protein Adsorption," Langmuir 22(6):2418-2421, 2006.
Chen, S., et al., "Strong Resistance of Phosphorylcholine Self-Assembled Monolayers to Protein Adsorption: Insights Into Nonfouling Properties of Zwitterionic Materials," Journal of the American Chemical Society 127(41):14473-14478, 2005.
Jun, Z., et al., "Surface Modification of Segmented Poly(ether urethane) by Grafting Sulfo Ammonium Zwitterionic Monomer to Improve Hemocompatibilities," Colloids and Surfaces B: Biointerfaces 28:1-9, 2003.
Li, L., et al., "Protein Adsorption on Alkanethiolate Self-Assembled Monolayers: Nanoscale Surface Structural and Chemical Effects," Langmuir 19(7):2974-2982, 2003.
Li, L., et al., "Protein Adsorption on Oligo(ethylene glycol)-Terminated Alkanethiolate Self-Assembled Monolayers: The Molecular Basis for Nonfouling Behavior," Journal of Physical Chemistry B 109(7):2934-2941, 2005.
Lowe, Ab., et al., "Well-Defined Sulfobetaine-Based Statistical Copolymers as Potential Antibioadherent Coatings," Journal of Biomedical Materials Research 52(1):88-94, Jul. 2000.
West, S.L., et al., "The Biocompatibility of Crosslinkable Copolymer Coatings Containing Sulfobetaines and Phosphobetaines," Biomaterials 25:1195-1204, 2004.
Yuan, J., "Platelet Adhesion Onto Segmented Polyurethane Surfaces Modified by Carboxybetaine," Journal of Biomaterial Science Polymers Edition 14(12):1339-1349, 2003.
Zhang, Z., "Surface Grafted Sulfobetaine Polymers Via Atom Transfer Radical Polymerization as Superlow Fouling Coatings," Journal of Physical Chemistry Part B 110(22):10799-10804, 2006.
Zheng, J., "Molecular Simulation Study of Water Interactions With Oligo (Ethylene Glycol)-Terminated Alkanethiol Self-Assembled Monolayers," Langmuir 20(20):8931-8938, 2004.
Zheng, J., "Strong Repulsive Forces Between Protein and Oligo (Ethylene Glycol) Self-Assembled Monolayers: A Molecular Simulation Study," Biophysical Journal 89:158-166, Jul. 2005.
Jiang, Y., et al., "Blood Compatibility of Polyurethane Surface Grafted Copolymerization With Sulfobetaine Monomer," Colloids and Surfaces B: Biointerfaces 36(1):27-33, Jul. 2004.
Yuan, J., et al., "Chemical Graft Polymerization of Sulfobetaine Monomer on Polyurethane Surface for Reduction in Platelet Adhesion," Colloids and Surfaces B: Biointerfaces 39(1-2):87-94, Nov. 2004.
Yuan, J., et al., "Improvement of Blood Compatibility on Cellulose Membrane Surface by Grafting Betaines," Colloids and Surfaces B: Biointerfaces 30(1-2):147-155, Jul. 2003.
Yuan, Y., et al., "Polyurethane Vascular Catheter Surface Grafted With Zwitterionic Sulfobetaine Monomer Activated by Ozone," Colloids and Surfaces B: Biointerfaces 35(1):1-5, May 2004.
Yuan, Y., et al., "Surface Modification of SPEU Films by Ozone Induced Graft Copolymerization to Improve Hemocompatibility," Colloids and Surfaces B: Biointerfaces 29(4):247-256, Jun. 2003.

(Continued)

*Primary Examiner*—Sheeba Ahmed
(74) *Attorney, Agent, or Firm*—Christensen O'Connor Johnson Kindness PLLC

(57) ABSTRACT

Super-low fouling sulfobetaine and carboxybetaine materials, super-low fouling surfaces and methods of making the surfaces coated with sulfobetaine and carboxybetaine materials, and devices having the super-low surfaces.

34 Claims, 31 Drawing Sheets

OTHER PUBLICATIONS

Zhang, J., et al., "Chemical Modification of Cellulose Membranes With Sulfo Ammonium Zwitterionic Vinyl Monomer to Improve Hemocompatibility," Colloids and Surfaces B: Biointerfaces 30(3):249-257, Jul. 2003.

Zhou, J., et al., "Platelet Adhesion and Protein Adsorption on Silicone Rubber Surface by Ozone-Induced Grafted Polymerization With Carboxybetaine Monomer," Colloids and Surfaces B: Biointerfaces 41(1):55-62, Mar. 2005.

Feng, W., et al., "Adsorption of Fibrinogen and Lysozyme on Silicon Grafted With Poly(2-methacryloyloxyethyl Phosphorylcholine) Via Surface-Initiated Atom Transfer Radical Polymerization," Langmuir 21(13):5980-5987, Jun. 2005.

Feng., W., et al., "Atom-Transfer Radical Grafting Polymerization of 2-Methacryloyloxyethyl Phosphorylcholine From Silicon Wafer Surfaces," Journal of Polymer Science: Part A: Polymer Chemistry 42(12):2931-2942, May 2004.

* cited by examiner

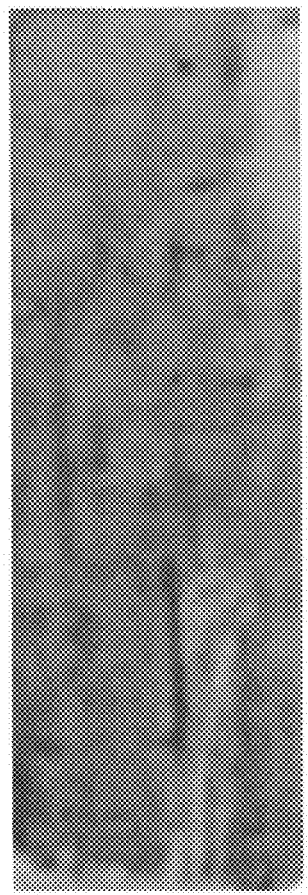 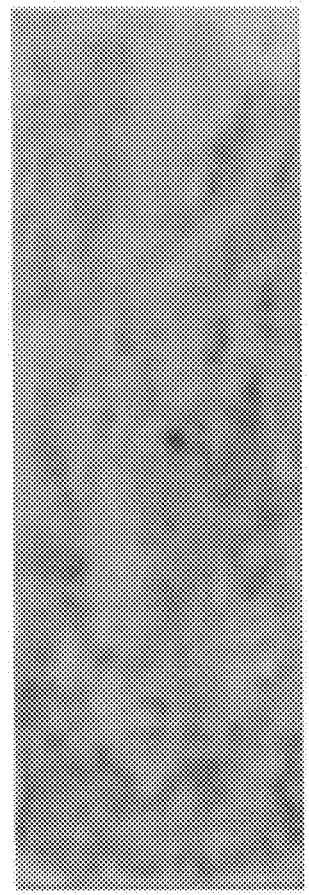
*Fig. 19A.*     *Fig. 19B.*

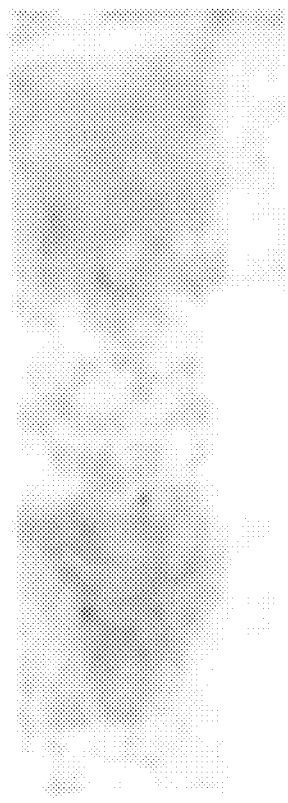 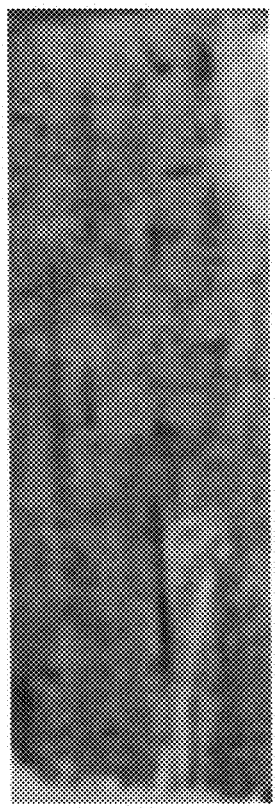 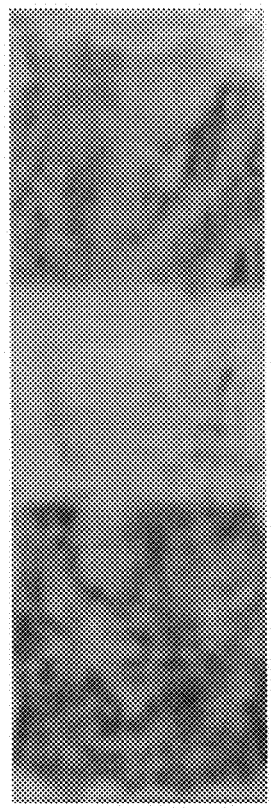
*Fig. 20A.*  *Fig. 20B.*  *Fig. 20C.*

TCPS                POLY(SBMA) HYDROGEL
AFTER 1 DAY
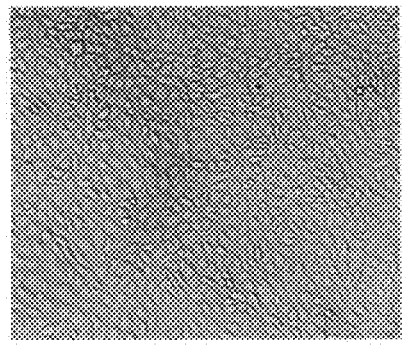 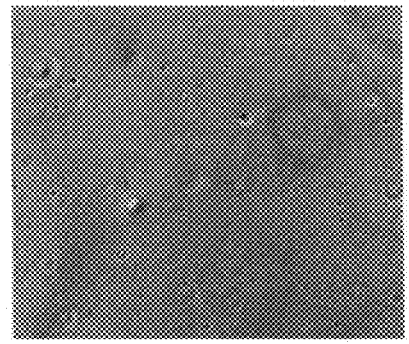
*Fig.30A.*          *Fig.30C.*
AFTER 5 DAYS
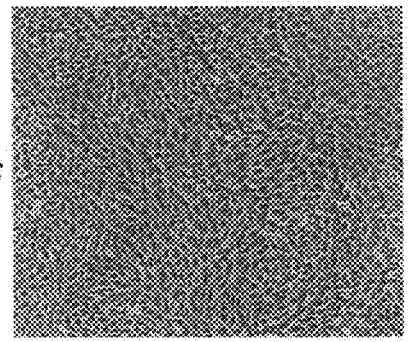 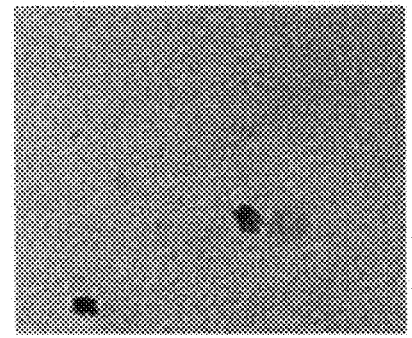
*Fig.30B.*          *Fig.30D.*

SUPER-LOW FOULING SULFOBETAINE AND CARBOXYBETAINE MATERIALS AND RELATED METHODS

CROSS-REFERENCE TO RELATED APPLICATION

This application is a continuation of International Patent Application No. PCT/US2006/028988, filed Jul. 25, 2006, which claims the benefit of U.S. Provisional Application No. 60/711,613, filed Aug. 25, 2005. Each application is incorporated herein by reference in its entirety.

STATEMENT OF GOVERNMENT LICENSE RIGHTS

This invention was made with Government support under grant number N00014-04-1-0409 awarded by the Office of Naval Research. The Government has certain rights in the invention.

BACKGROUND OF THE INVENTION

Surface resistance to protein adsorption is important for many applications, such as coatings for ship hulls, implanted biomaterials, biomedical diagnostics and sensors, bioseparations, and drug delivery. For example, marine biofouling leads to problems ranging from propulsive fuel losses due to increased drag to reduced capacity for speed and range. Many hydrophilic surfaces can reduce protein adsorption. However, these surfaces are often not sufficient to prevent the undesirable adhesion of cells, bacteria, or other microorganisms. Even a small amount of proteins on a surface can lead to the adhesion and propagation of unwanted fouling. For example, fibrinogen adsorption less than 5-10 $ng/cm^2$ is needed to inhibit platelet adhesion for blood compatibility and super-low fouling surfaces are required for these applications. Nonfouling materials have the ability to prevent nonspecific protein adsorption from the surfaces coated with these materials. Surface or material resistance to protein adsorption and cell/microorganism adhesion is critical to the development of environmentally friendly antifouling or nonfouling paints for marine application, biomaterials with superior compatibility, and biosensors with high specificity.

Traditionally, the best antifouling coating for marine application is TBT (tributyltin)-based paint. Due to increased environmental concern over the effects of TBT on non-target marine organisms, particularly in areas of low water exchange such as coastal estuaries and marinas, TBT antifouling coatings have been restricted in many countries including the United States. The TBT-free antifouling paint in the current market is based on non-tin biocide, such as copper particles or cuprous oxide. Because these paints leach copper into water, these biocides are harmful to the marine environment, and their application is highly limited. Non-toxic, fouling-release silicone and fluorinated coatings are under development. However, these coatings are only effective on vessels moving at high speeds. As fouling occurs most readily on static structures or ship moving slowly in seawater close to land, the application of these coatings is highly limited. There is a need for environmentally friendly nonfouling coatings to which marine microorganisms do not attach.

A variety of polymers have been used as biocompatible materials in biomedical fields. However, only a few candidates are regarded as "non-fouling materials" or "superlow fouling materials". Poly(ethylene glycol) (PEG)-based materials are the most commonly used nonfouling materials. PEG or oligo(ethylene glycol) (OEG) modified surfaces have been extensively studied to resist nonspecific protein adsorption. Steric exclusion effect was considered as one of the reasons for PEG polymers to resist protein adsorption. Studies of OEG self-assembled monolayers (SAMs) show that the appropriate surface density of OEG chains is needed for surface resistance to protein adsorption and a tightly bound water layer around OEG chains is mainly responsible for large repulsive hydration forces. However, PEG or OEG group auto-oxidizes relatively rapidly, especially in the presence of oxygen and transition metal ions and most biochemically relevant solutions contain transition metal ions. It has also been shown that grafted PEG brushes exhibit protein resistance at room temperature, but lose their protein repulsive properties above 35° C. It is of great interest to search for alternative nonfouling materials other than PEG.

Phosphorylcholine (PC)-based polymers or surfaces have been shown to decrease protein adsorption. They are considered as biomimetic fouling-resistant materials because they contain phosphorylcholine headgroups, which are found in the outside layer of cell membranes. The majority of work relating to phosphorylcholine (PC)-based materials is on methacryloyloxyethyl phosphorylcholine (MPC)-based copolymers with the PC group located in the side chains, such as MPC-co-BMA (butylmethacrylate). MPC-based copolymers have been used commercially in contact lenses. An alternative approach is to form PC-terminated self-assembly monolayers (SAMs) on gold. Fibrinogen adsorption as low as 18% of a ML (monolayer) with respect to that on methyl-terminated SAMs has been reported. The hydration of PC-based materials is also thought to be the reason for their resistance to protein adsorption. However, the phosphoester group is susceptible to hydrolysis, and PC monomers, such as 2-methacryloyloxyethyl phosphorylcholine (MPC), are moisture sensitive and not easy to synthesize and handle. It is desirable to develop new materials other than PC for applications requiring long-term material stability.

Similar to phosphorylcholine-based polymers, sulfobetaine polymers belong to polybetaine polymers, in which both cationic and anionic groups are on the same monomer residue. Compared to MPC, sulfobetaine methacrylate (SBMA) is easier to synthesize and handle. However, SBMA polymers were thought to be less fouling-resistant than PC polymers. Because most previous studies of SBMA polymers concentrated on their copolymers with other hydrophobic monomers in order to attach them onto substrates or provide mechanical strength, the potential of sulfobetaines as non-fouling materials or biocompatible materials has been underestimated.

Segmented polyurethane (SPU) is one of the widely used biomaterials, especially in cardiovascular devices, due to its excellent mechanical properties. A series of studies have reported on improving its biocompatibility with MPC-based polymers via surface grafting, polymer blending, or interpenetrating polymer networks (IPNs). Ishihara and co-workers have performed extensive studies of MPC/SPU films that form a stable cross-linked network and effectively reduce platelet adhesion as compared to the original SPU. Morimoto, K. et al. *Biomaterials* 23:4881-87, 2002; Morimoto, K. et al. *Biomaterials* 25:5353-61, 2004. Because of the moisture sensitivity of MPC monomer, it is desirable to develop new SPU-based materials other MPC/SPU films with super-low fouling characters.

A need therefore exists for super-low fouling materials. In this way, the super-low fouling material can be used in making super-low fouling surfaces that are useful in coatings for ship hulls, implanted biomaterials, biomedical diagnostics sensors, drug delivery. These and other objectives are accomplished by the invention set forth below.

SUMMARY OF THE INVENTION

The present invention provides super-low fouling sulfobetaine and carboxybetaine materials, super-low fouling surfaces and methods of making the surfaces coated with super-low fouling sulfobetaine and carboxybetaine materials, and devices having the super-low fouling surfaces.

In one aspect, the present invention provides a substrate having a surface coated with a sulfobetaine or carboxybetaine material. The substrate has a surface having at least a monolayer of a sulfobetaine or a carboxybetaine material thereon. The surface lacks a defect larger than about 1 nm$^2$, and has a fibrinogen adsorption less than about 30 ng/cm$^2$. In one embodiment, the surface has a fibrinogen adsorption less than about 10 ng/cm$^2$. In one embodiment, the surface has a fibrinogen adsorption less than about 5 ng/cm$^2$. In one embodiment, the surface has a fibrinogen adsorption less than about 0.3 ng/cm$^2$.

In one embodiment, the sulfobetaine material is a poly(sulfobetaine). The sulfobetaine material can be prepared from one or more monomers selected from the group consisting of sulfobetaine acrylates, sulfobetaine acrylamides, sulfobetaine vinyl compounds, sulfobetaine epoxides, and mixtures thereof. In one embodiment, the monomer is sulfobetaine methacrylate.

In one embodiment, the carboxybetaine material is a poly(carboxybetaine). The carboxybetaine material can be prepared from one or more monomers selected from the group consisting of carboxybetaine acrylates, carboxybetaine acrylamides, carboxybetaine vinyl compounds, carboxybetaine epoxides, and mixtures thereof. In one embodiment, the monomer is carboxybetaine methacrylate.

In one embodiment, the sulfobetaine material is a diblock copolymer comprising a poly(sulfobetaine). In one embodiment, the diblock copolymer comprises poly(propylene oxide).

In one embodiment, the sulfobetaine material is an interpenetrating polymer network. In one embodiment, the carboxybetaine material is an interpenetrating polymer network. The interpenetrating polymer network can include a polymer selected from the group consisting of a polyurethane, a silicone, a polyester, a polyethylene, and a polyamide.

In one embodiment, the sulfobetaine material is a polymer blend comprising at least one of a poly(sulfobetaine) or a poly(carboxybetaine).

In another aspect, the present invention provides a substrate having a surface coated with a sulfobetaine or carboxybetaine polymer attached to a layer (e.g., monolayer) covalently coupled to the surface. In one embodiment, the sulfobetaine or carboxybetaine polymer is covalently attached to the monolayer. In one embodiment, the monolayer is a self-assembled monolayer. In one embodiment, the polymer is a poly(sulfobetaine). In another embodiment, the polymer is poly(carboxybetaine). In one embodiment, the substrate has a surface comprising a sulfobetaine or carboxybetaine polymer covalently attached to an immobilized compound forming a monolayer on the surface.

In another aspect of the present invention, crosslinked polymer hydrogels are provided. In one embodiment, the hydrogel is a crosslinked poly(sulfobetaine) hydrogel. In another embodiment, the hydrogel is a crosslinked poly(carboxybetaine) hydrogel.

In further aspects, the present invention provides methods for making low fouling surfaces. In one embodiment, the method includes (a) forming a radical initiator terminated monolayer on a substrate surface; and (b) polymerizing a monomer on the radical initiator terminated monolayer, wherein the monomer is a sulfobetaine or carboxybetaine. The monomer can be selected from the group consisting of sulfobetaine acrylates, sulfobetaine acrylamides, sulfobetaine vinyl compounds, sulfobetaine epoxides, and mixtures thereof, or can be selected from the group consisting of carboxybetaine acrylates, carboxybetaine acrylamides, carboxybetaine vinyl compounds, carboxybetaine epoxides, and mixtures thereof. In one embodiment, the monolayer is a self-assembled monolayer.

In one embodiment, the method includes (a) forming a hydroxy terminated monolayer on a substrate surface; (b) converting the hydroxy terminated monolayer to a radical initiator terminated monolayer; and (c) polymerizing a monomer on the radical initiator monolayer. The monomer can be a sulfobetaine or carboxybetaine, such as described above, and the monolayer can be a self-assembled monolayer.

In another embodiment, the method includes (a) forming a alkyl terminated monolayer on a substrate surface; (b) treating the alkyl terminated monolayer with a first diblock copolymer; and (c) treating the alkyl terminated monolayer with a second diblock copolymer. In one embodiment, the first diblock copolymer comprises a [hydrophobic monomer]$_l$-block-[hydrophilic monomer]$_m$ copolymer. In one embodiment, the first diblock copolymer comprises a [propylene oxide]$_l$-block-[sulfobetaine methacrylate]$_m$ copolymer. In one embodiment, the second diblock copolymer comprises a [hydrophobic monomer]$_l$-block-[hydrophilic monomer]$_n$ copolymer. In one embodiment, the second diblock copolymer comprises a [propylene oxide]$_l$-block-[sulfobetaine methacrylate]$_n$ copolymer. For these polymers l is an integer from 10-30, m is an integer from 10-100, n is an integer from 10-50, and m is greater than n.

Novel block copolymers useful for making low fouling surfaces are also provided.

In other aspects of the invention, devices and materials having low fouling surfaces are provided. The devices and materials have surfaces that include at least a monolayer of a sulfobetaine or a carboxybetaine material, wherein the surface lacks a defect larger than about 1 nm$^2$, and wherein the surface has a fibrinogen adsorption less than about 30 ng/cm$^2$. Representative devices and materials include implantable materials, contact lenses, in vivo sensors, ship hulls, tissue scaffolds, implantable medical devices, membranes, non-viral gene delivery carriers, particles, and paints. In one embodiment, the invention provides a ship hull coated with a paint comprising a particle having a low fouling surface, wherein the surface comprises at least a monolayer of a sulfobetaine or a carboxybetaine material, wherein the surface lacks a defect larger than about 1 nm$^2$, and wherein the surface has a fibrinogen adsorption less than about 30 ng/cm$^2$.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 3:
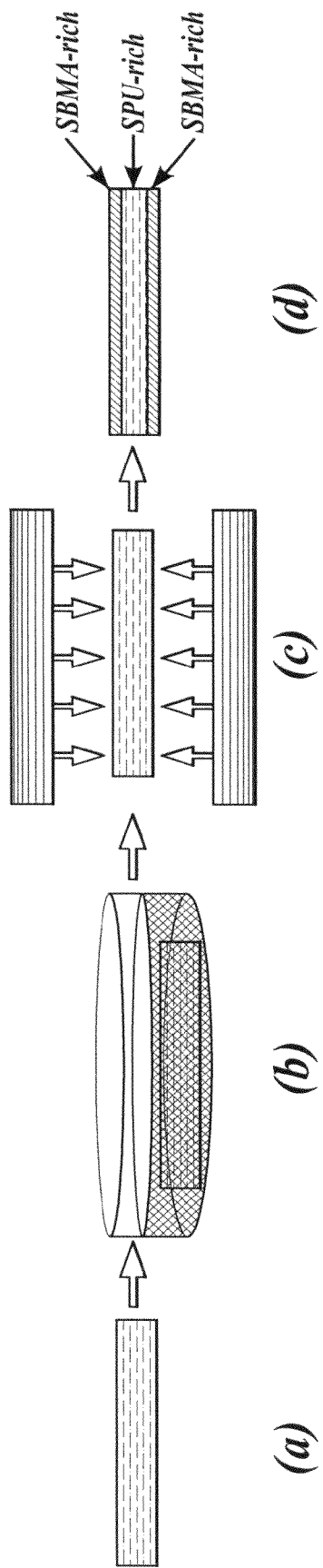
Figure 4:
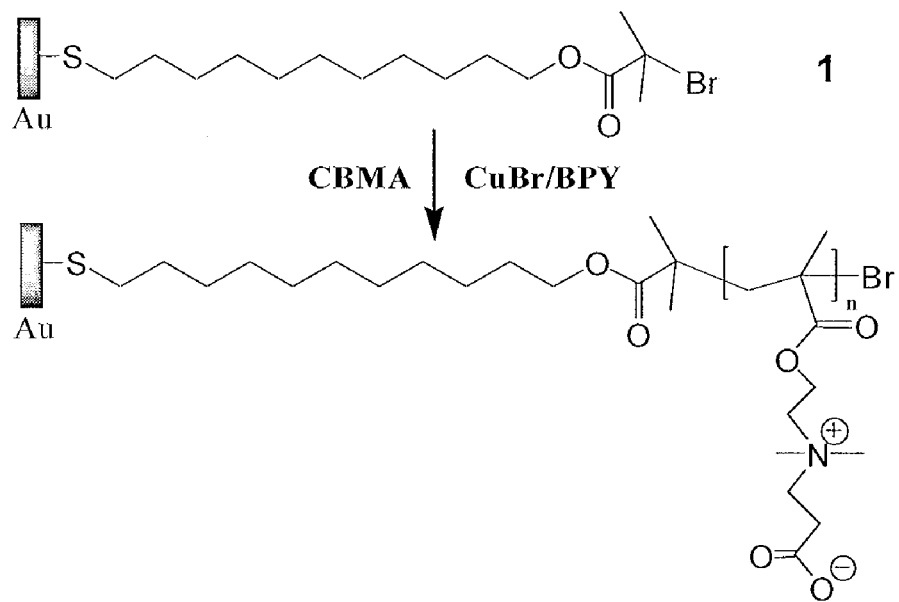
Figure 5A:
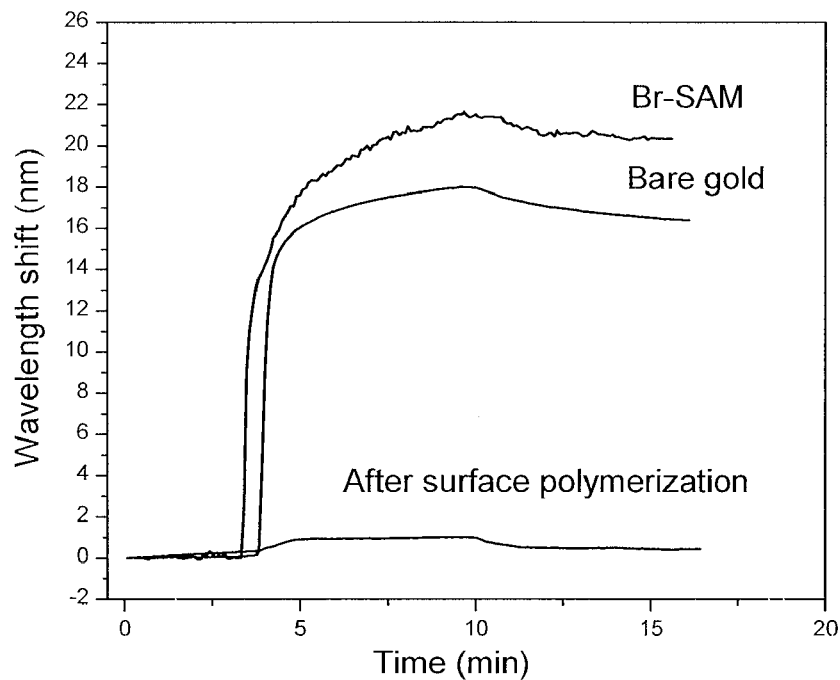
Figure 5B:
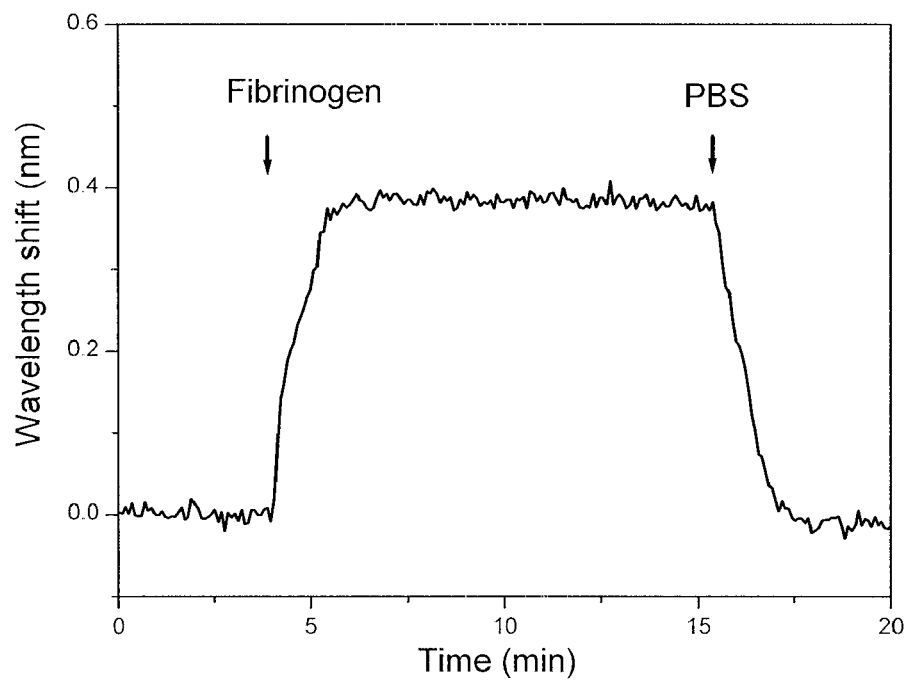
Figure 6:
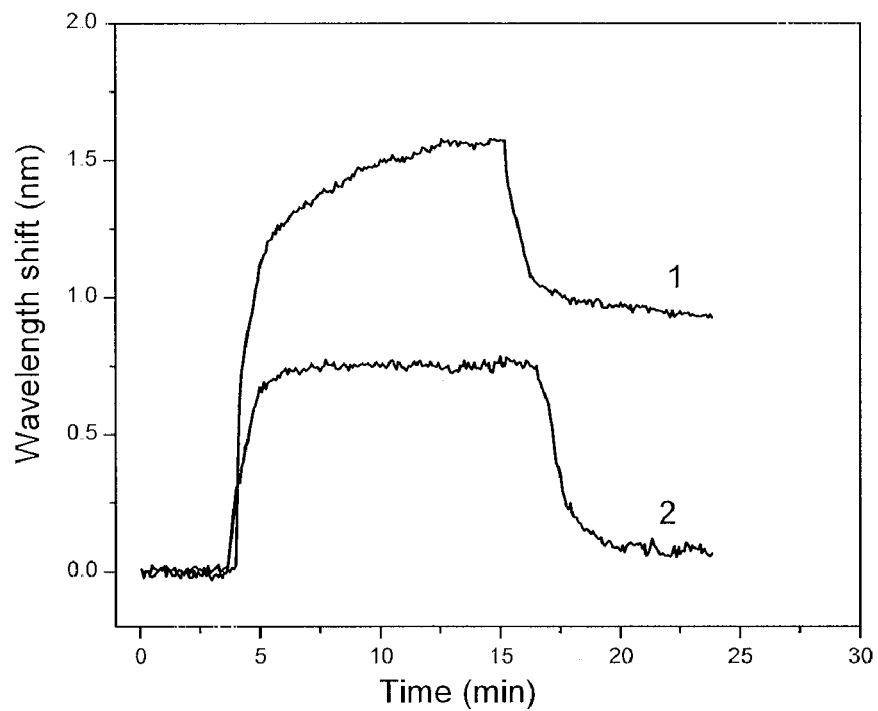
Figure 7:
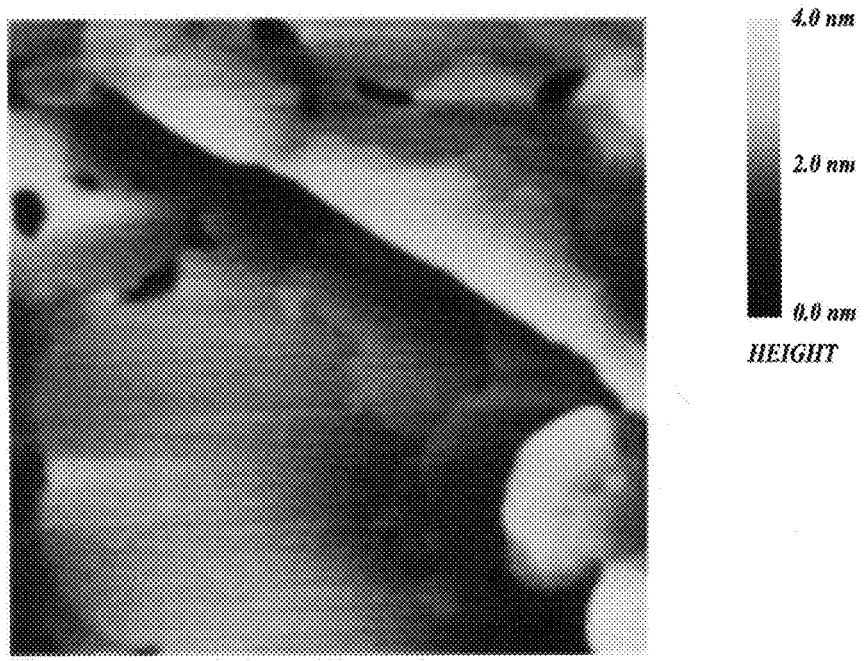
Figure 8:
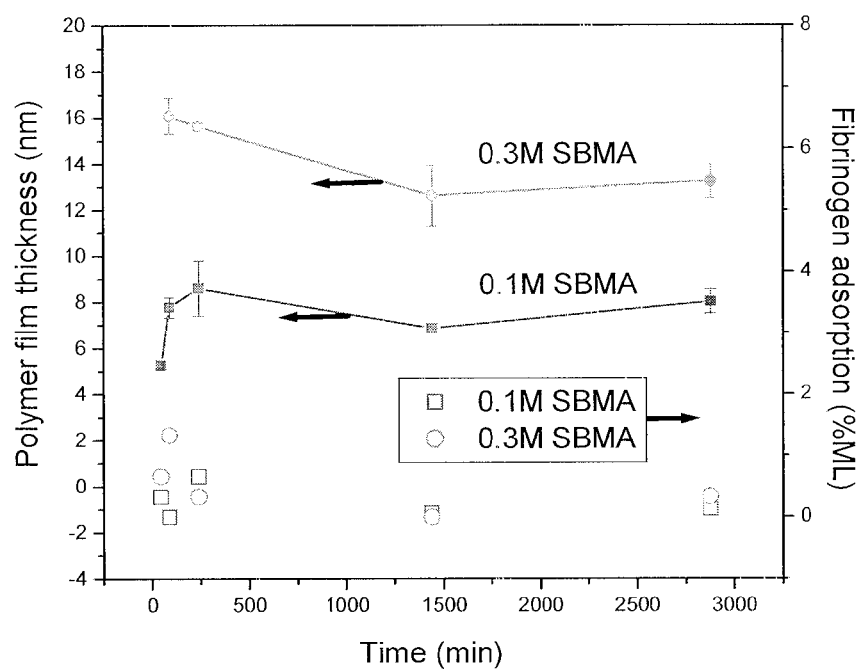
Figure 9:
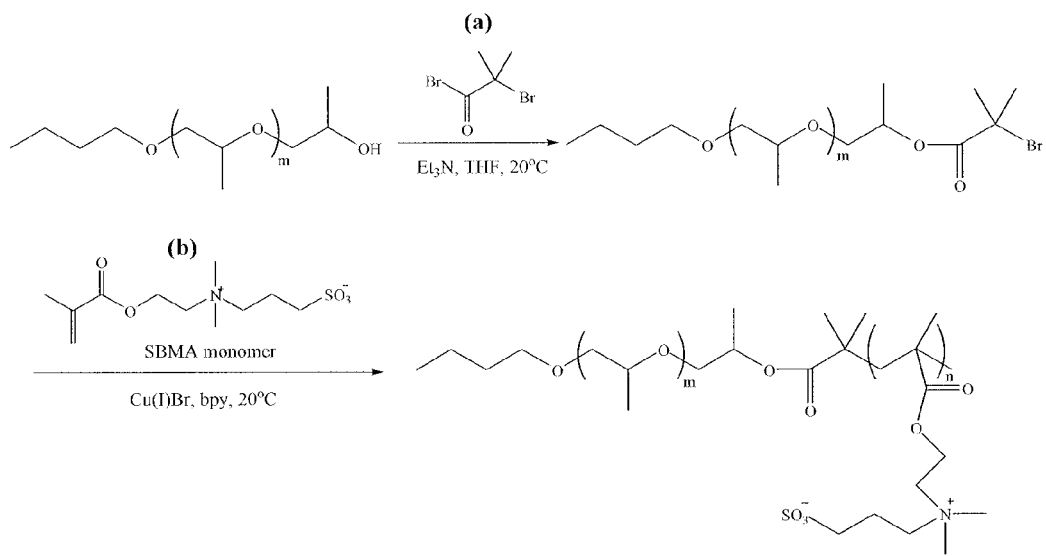
Figure 10:
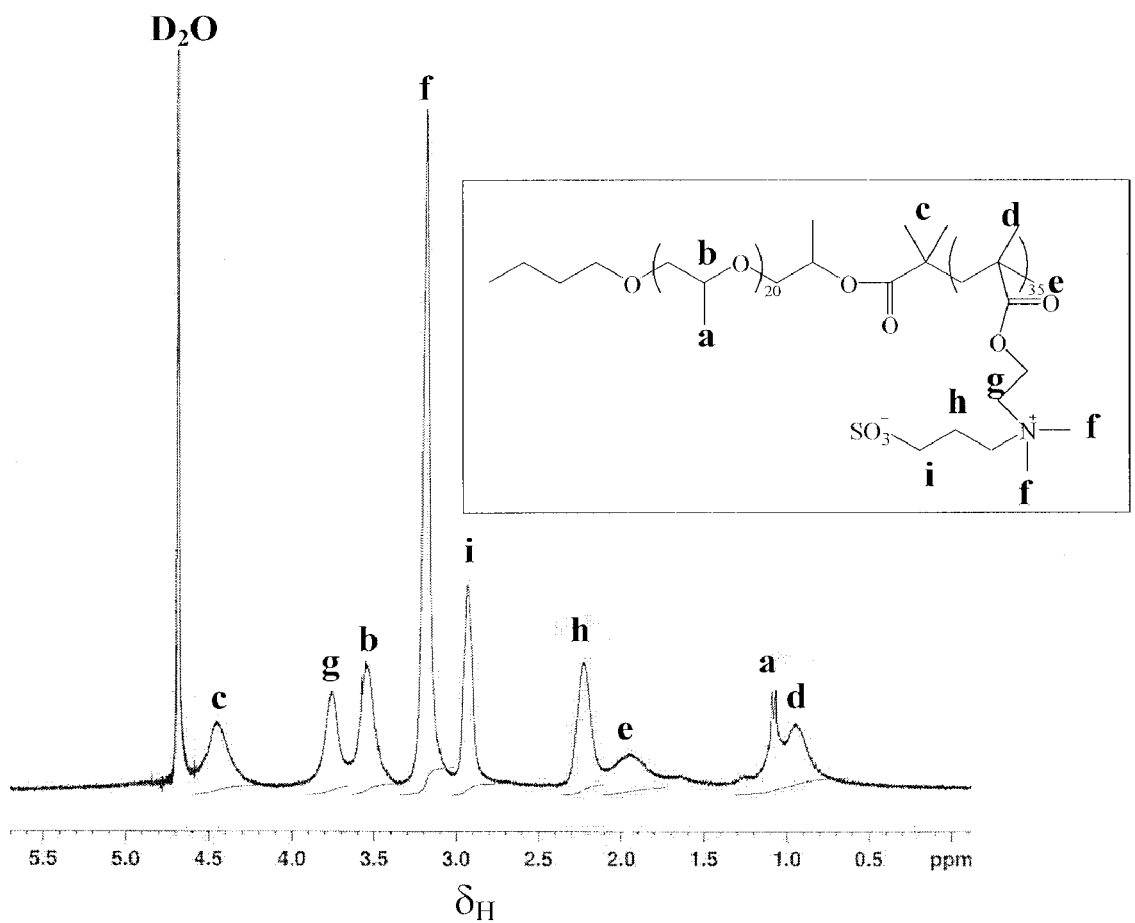
Figure 11:
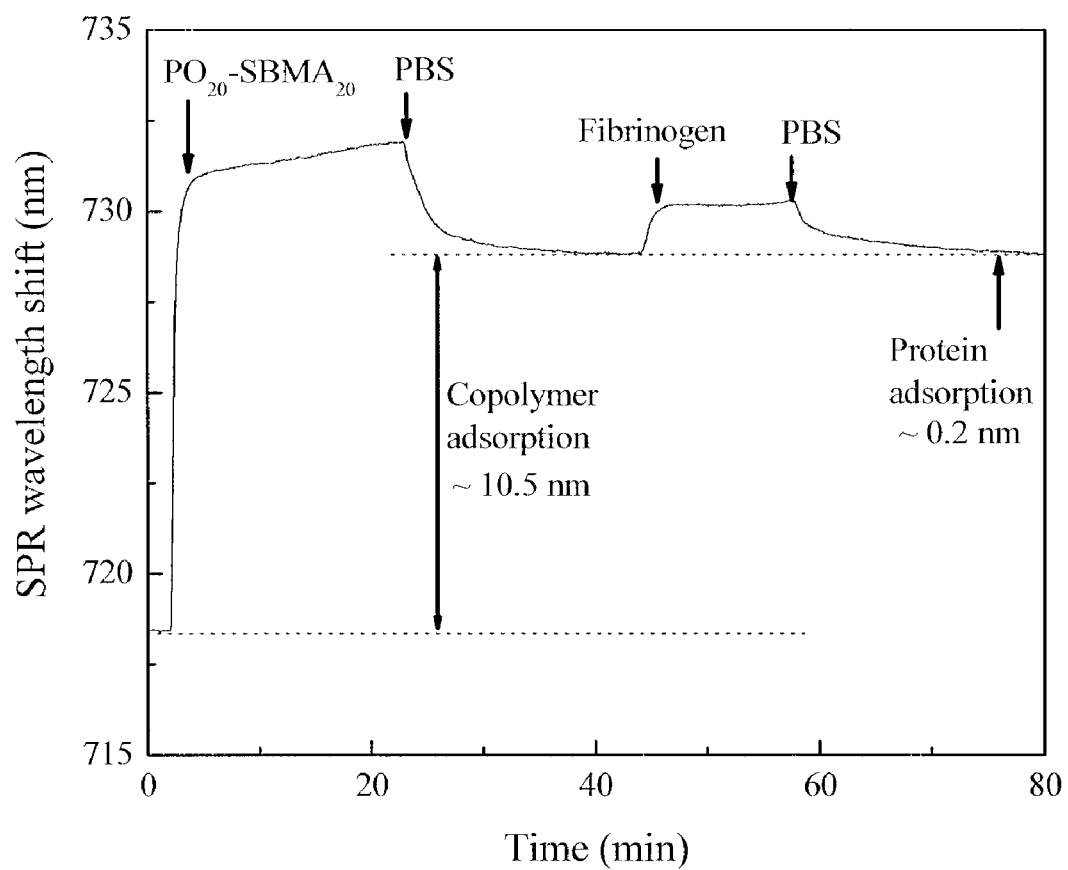
Figure 12:
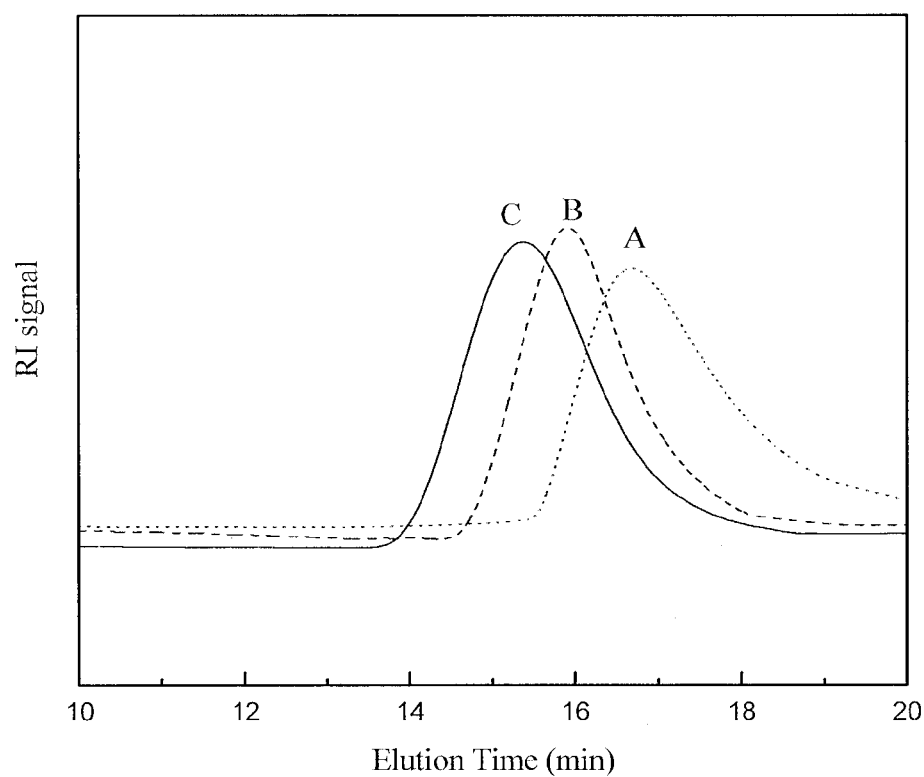
Figure 13:
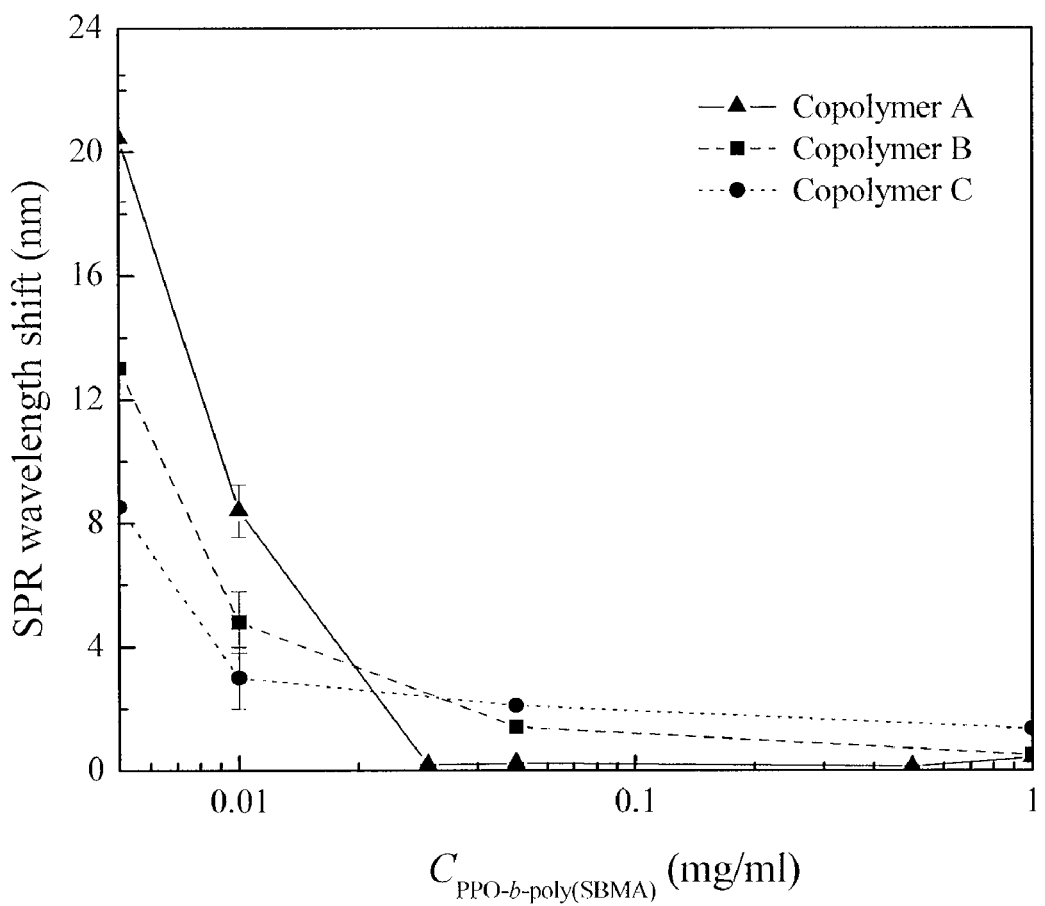
Figure 14:
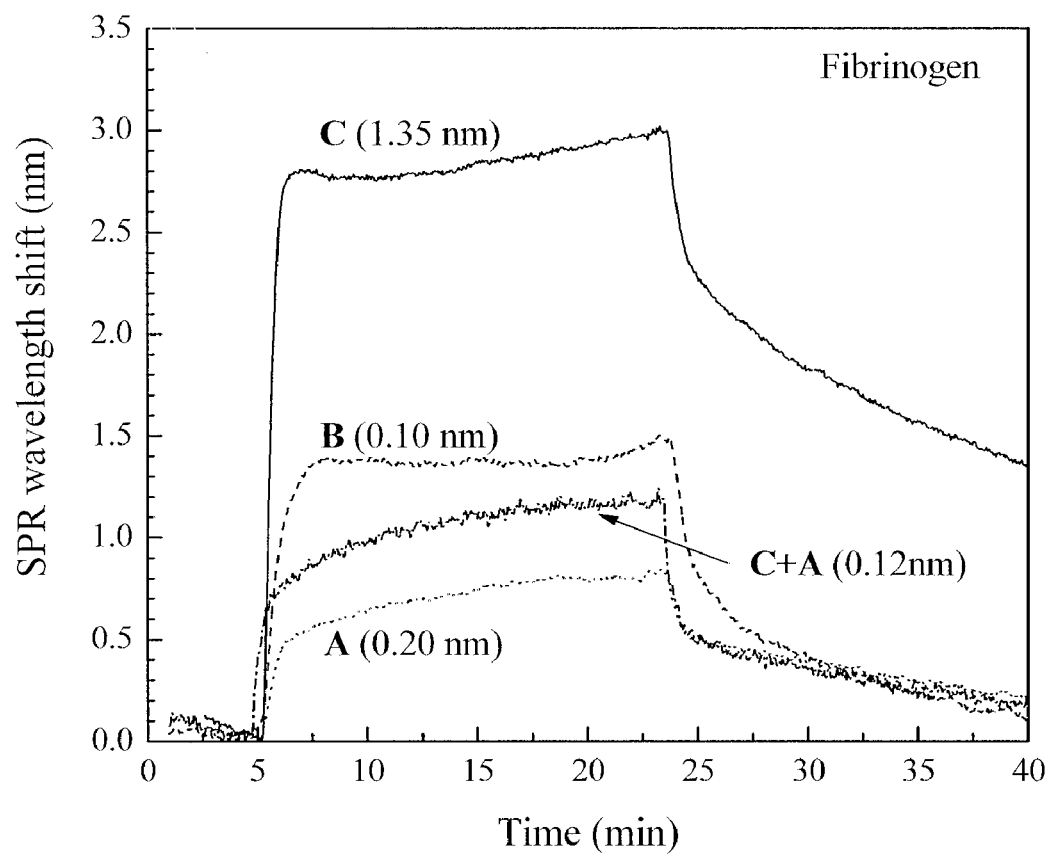
Figure 15:
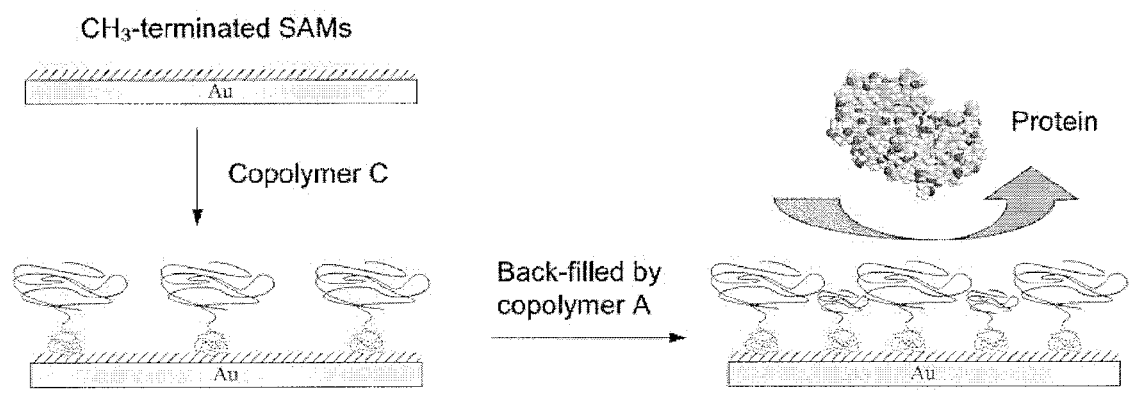
Figure 16:
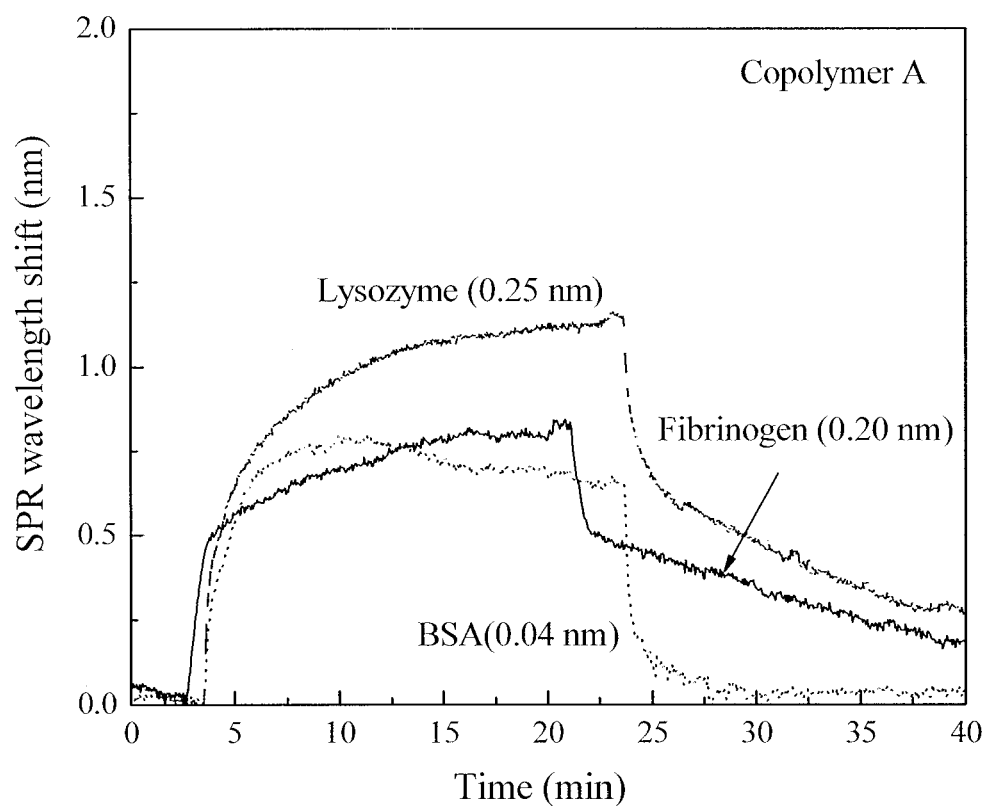
Figure 17:
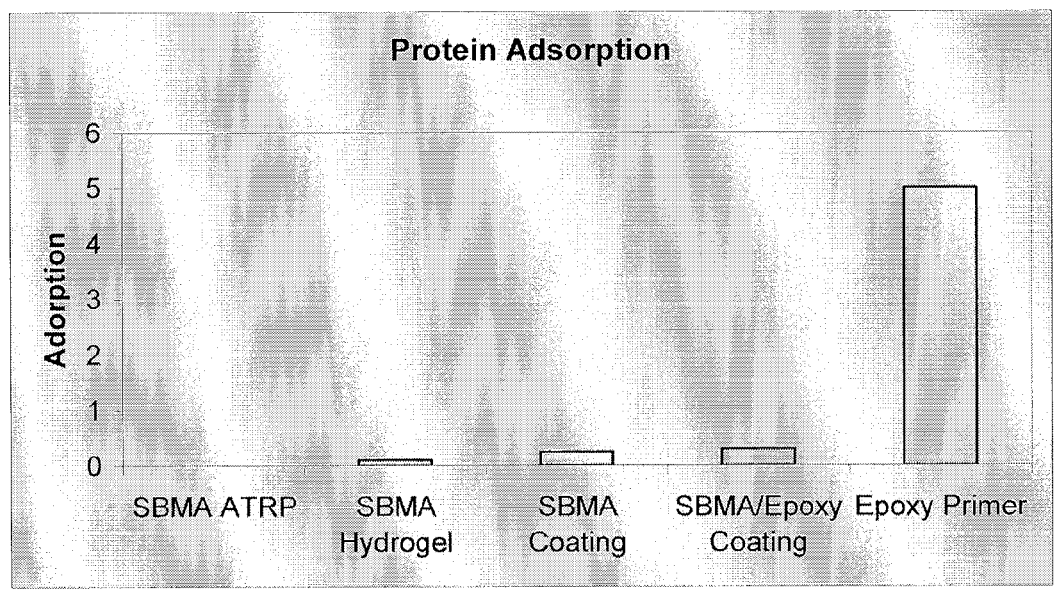
Figure 18:
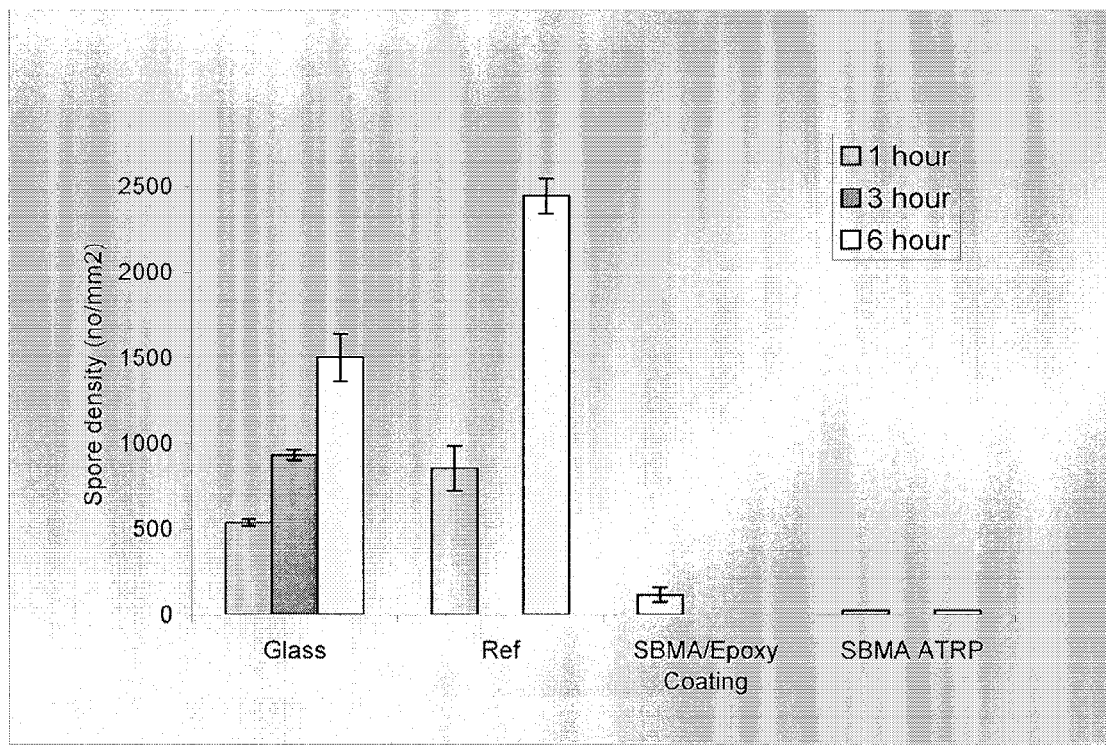
Figure 21:
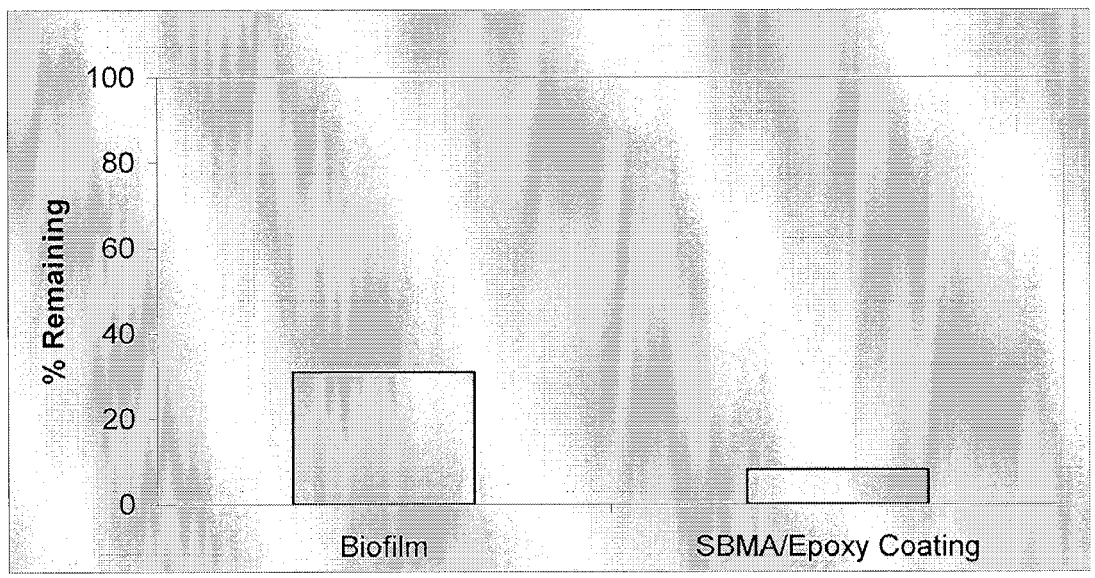
Figure 22:
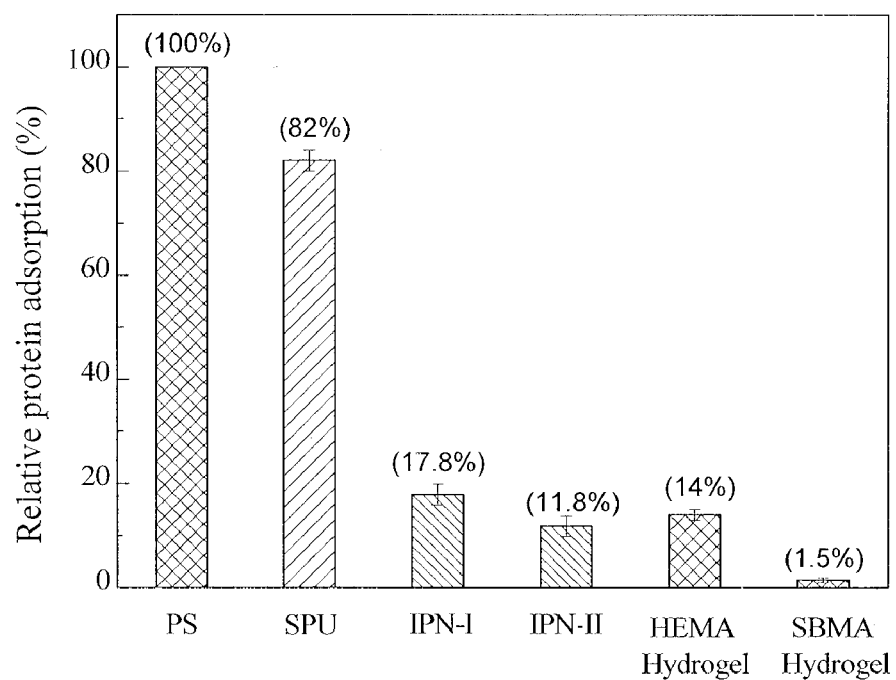
Figure 23A:
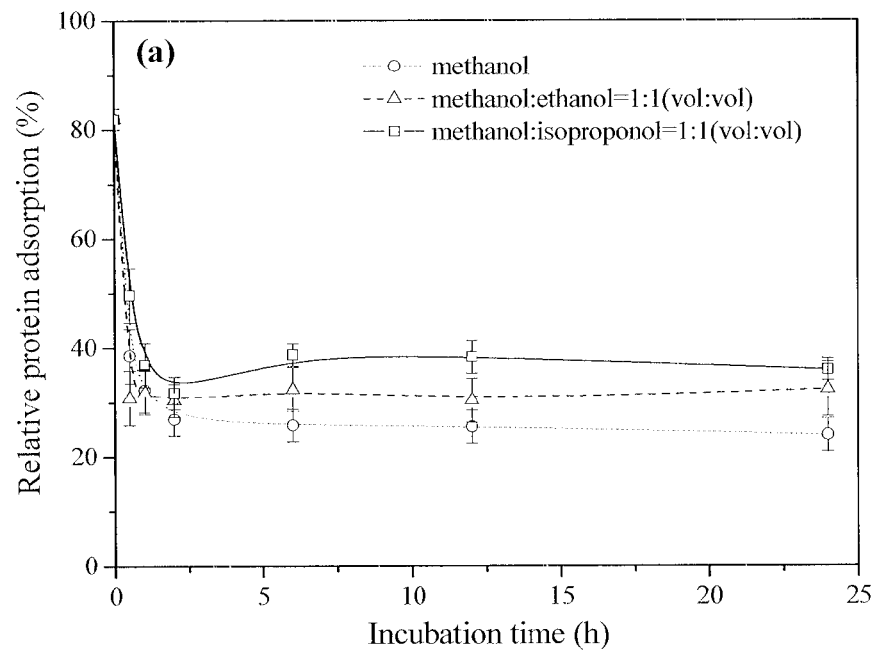
Figure 23B:
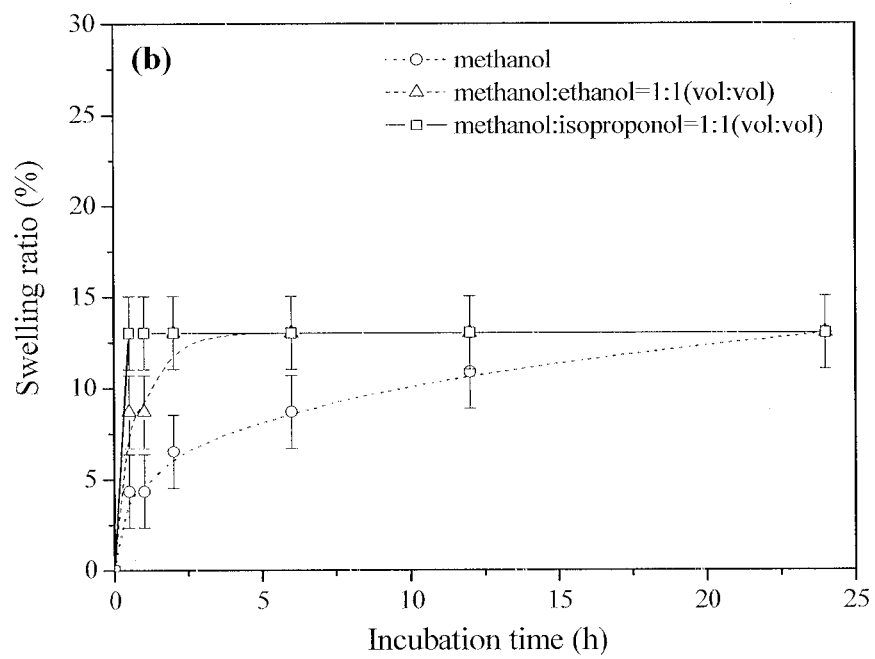
Figure 24:
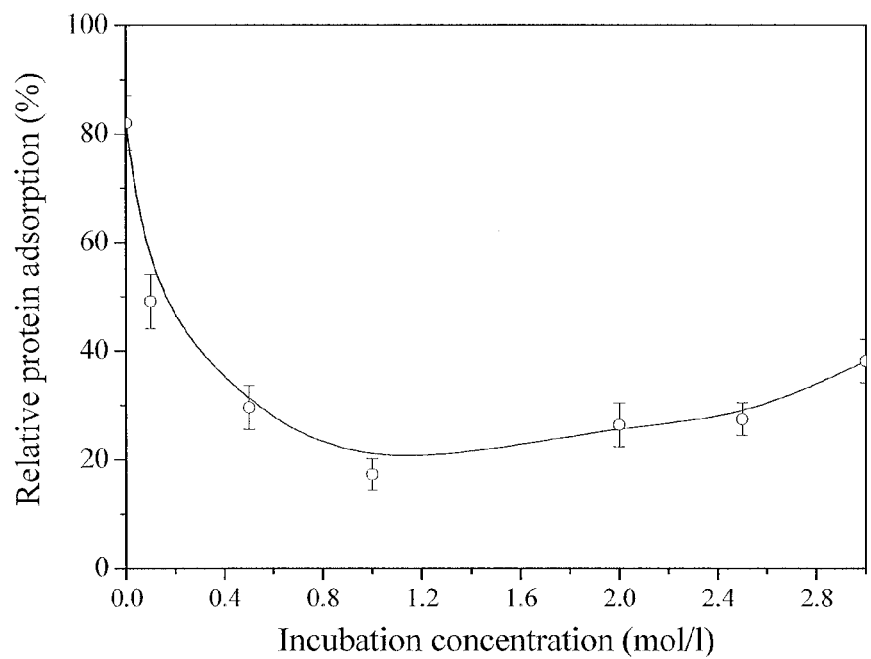
Figure 25A:
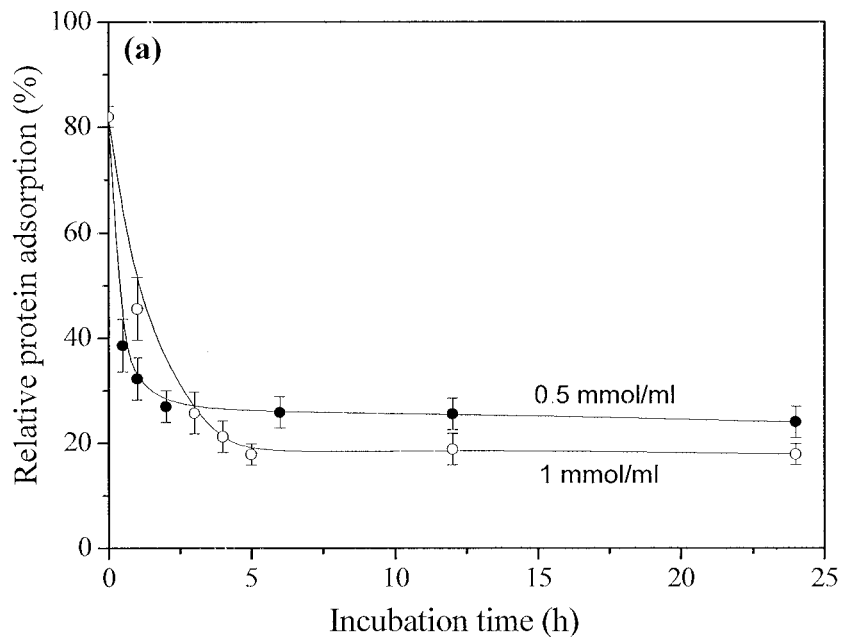
Figure 25B:
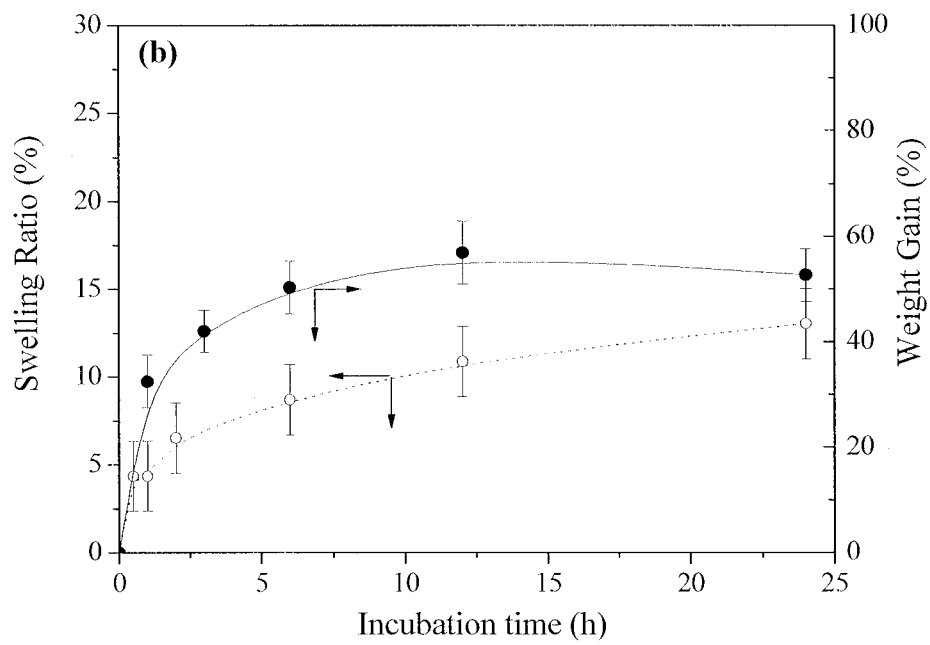
Figure 26:
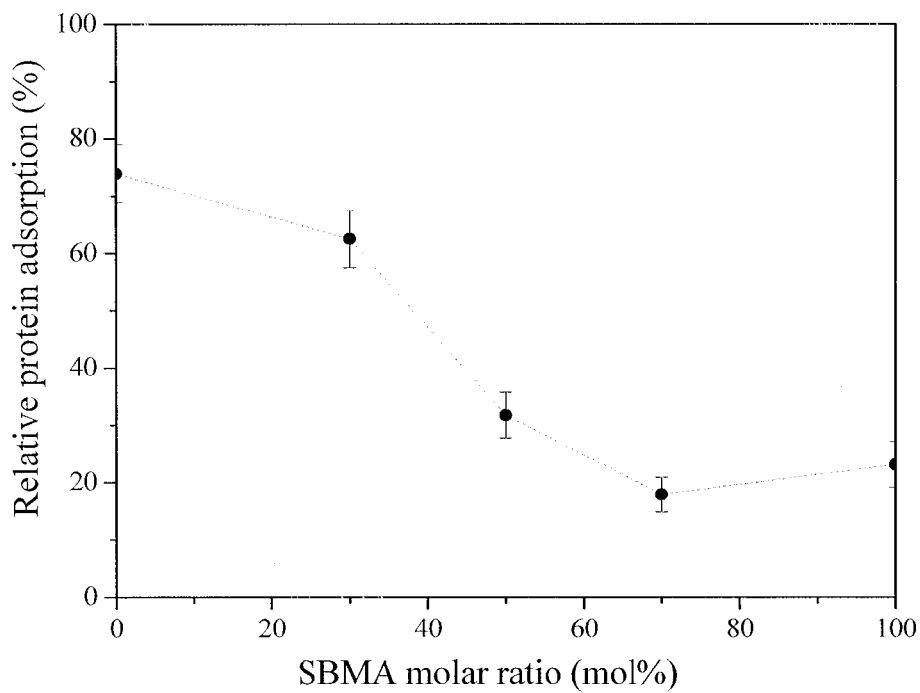
Figure 27:
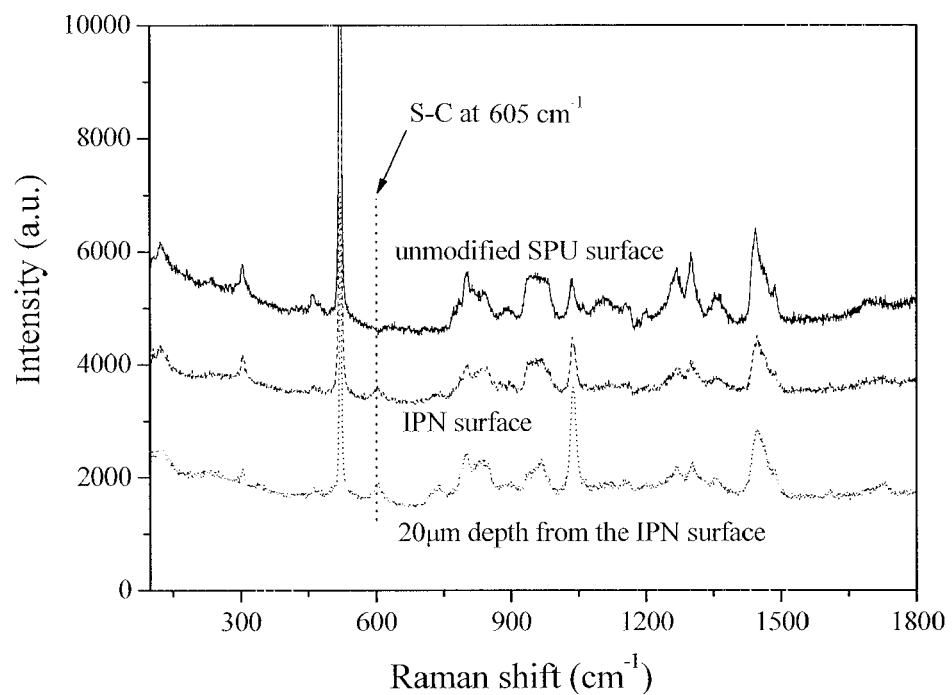
Figure 28:
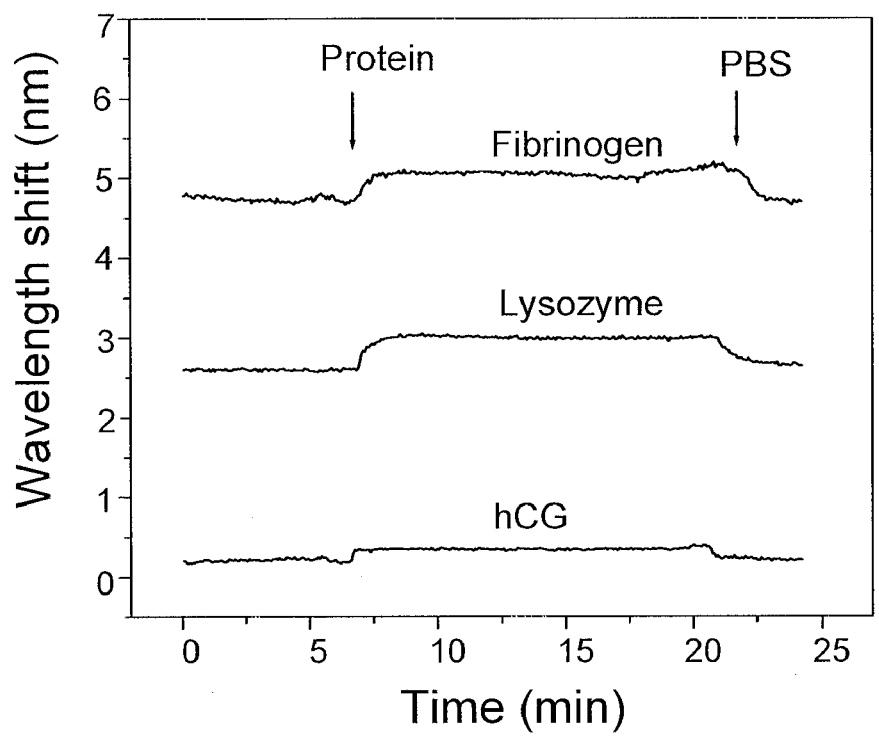
Figure 29:
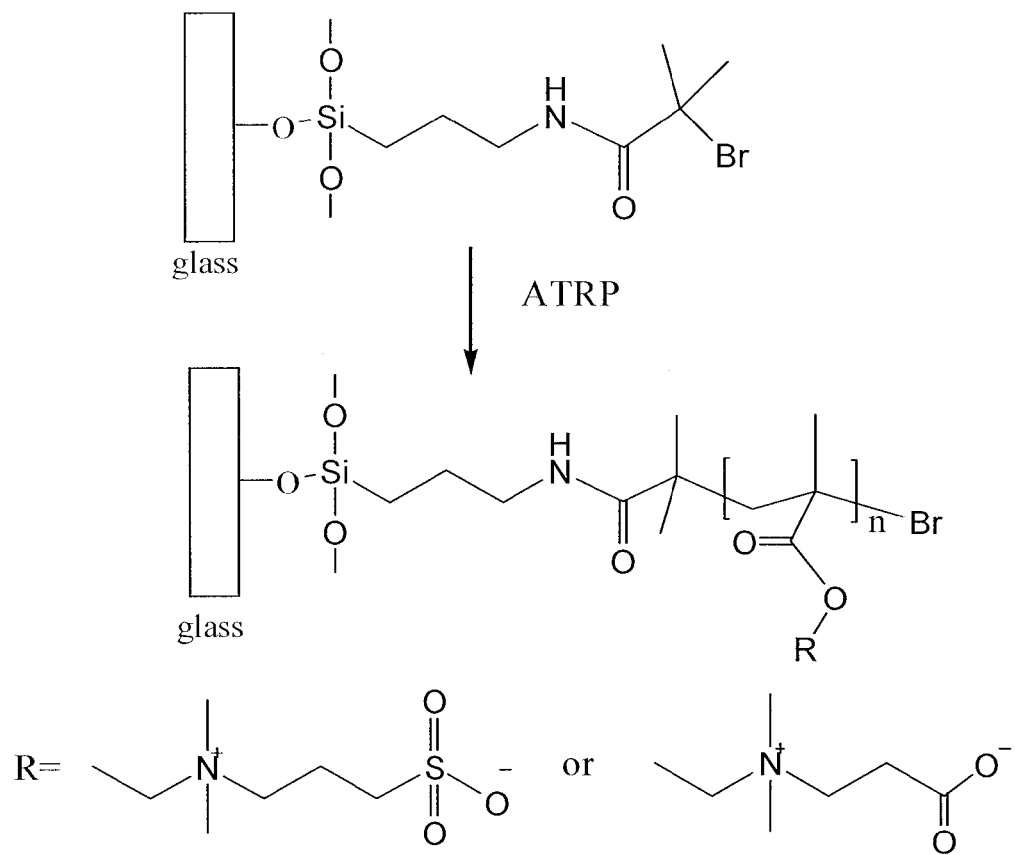
Figure 31:
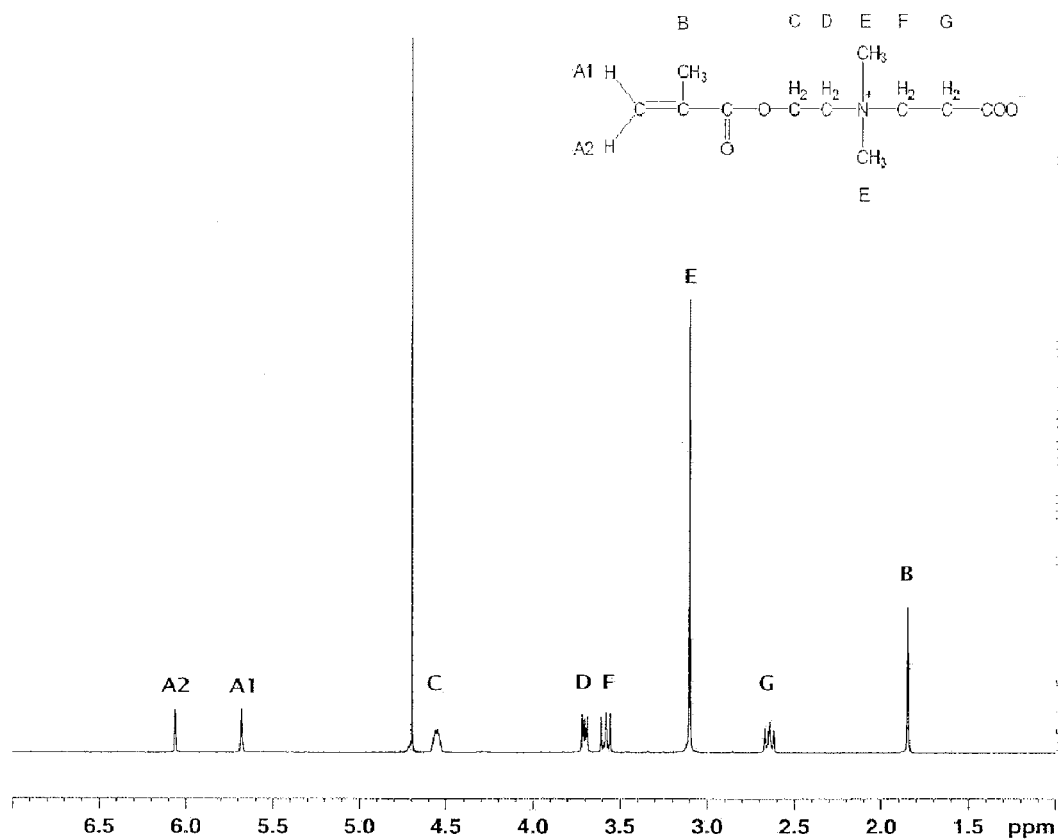

material by surface initiated atom transfer radical polymerization (ATRP) in accordance with the present invention;

FIG. 3 is a schematic illustration of a method for preparing an interpenetrating polymer network (IPN) film in accordance with the present invention: (a) a segmented polyurethane (SPU) film is prepared by solvent evaporation from dimethylacetamide (DMA) at 20° C.; (b) the SPU film incubated in a methanol solution containing sulfobetaine methacrylate (SBMA) monomer, 2-hydroxyethyl methacrylate (HEMA) monomer, GDGDA crosslinker, and photoinitiators at 20° C., (c) photo-polymerization with visible light; (d) providing IPNs of SPU/poly(SBMA);

FIG. 4 is a schematic illustration of a method for preparing a surface coated with a representative poly(carboxybetaine) (CBMA) by surface initiated atom transfer radical polymerization (ATRP) in accordance with the present invention;

FIGS. 5A and 5B are graphs comparing the adsorption of fibrinogen to a representative surface of the invention (a poly (sulfobetaine) coated surface) obtained by surface plasmon resonance (SPR) measurements (wavelength shift as a function of time): FIG. 5A illustrates the adsorption of 1 mg/mL fibrinogen in PBS buffer (0.15 M, pH 7.4) on a bare gold surface (Bare gold), a gold surface with immobilized initiator 1 (Br-SAM), and a surface grafted with poly(SBMA) (After surface polymerization, prepared by polymerization on a Br-SAM surface immersed in 25 mL $CH_3OH/H_2O$ containing 7.5 mmol SBMA, 2 mmol bipyridine (BPY), and 1 mmol CuBr for 1 hour, a wavelength shift of 1 nm in SPR is equivalent to 0.15 mg/m$^2$ adsorbed proteins); and FIG. 5B illustrates the adsorption of 1 mg/mL fibrinogen in PBS buffer (0.15 M, pH 7.4) on a representative surface of the invention (a poly (sulfobetaine) coated surface);

FIG. 6 is a SPR sensorgram (a graph illustrating wavelength shift as a function of time) of fibrinogen adsorption on a representative surface of the invention (a poly(sulfobetaine) coated surface) with unbound initiators (1) and without unbound initiators (2) (two substrates were placed into the same reactor for polymerization with 2.0 mmol SBMA, 0.1 mmol BPY and 0.05 mmol CuBr in 25 mL $CH_3OH/H_2O$ for 17 hours;

FIG. 7 is a taping mode atomic force microscope (TM-AFM) image of initiator 1 SAM on a gold substrate (scan size: 1 μm×1 μm) (the surface was prepared in 10 mM initiator 1 solution for 24 hours and then washed with ethanol and THF;

FIG. 8 is a graph comparing the polymer film thickness and fibrinogen adsorption of representative surfaces of the invention as a function of SBMA concentration and polymerization time: thickness of poly(SBMA) thickness was measured by ellipsometry (solid symbols) and fibrinogen adsorption was measured by SPR (open symbols) (for 0.1 M SBMA polymerization: 2.5 mmol SBMA, 1 mmol BPY and 0.5 mmol CuBr in 25 mL $CH_3OH/H_2O$; for 0.3 M SBMA polymerization: 7.5 mmol SBMA, 2 mmol BPY and 1 mmol CuBr in 25 mL $CH_3OH/H_2O$), % ML (monolayer) fibrinogen adsorption reported is with respect to that on a $CH_3$ SAM;

FIG. 9 is a schematic illustration of the preparation of a representative block copolymer of the invention: (a) the reaction of monohydroxy-capped polypropylene oxide (PPO) with 2-bromoisobutyryl bromide in THF at 20° C. and (b) the block copolymerization of SBMA with PPO by ATRP in methanol at 20° C.;

FIG. 10 is the $^1$H NMR spectrum ($D_2O$) of a representative block copolymer of the invention, $PO_{20}$-$SBMA_{35}$ diblock copolymer;

FIG. 11 is a SPR sensorgram illustrating the adsorption of a representative copolymer of the invention, $PO_{20}$-$SBMA_{20}$ (copolymer A), to a substrate surface, followed by in situ evaluation of fibrinogen adsorption;

FIG. 12 are aqueous gel permeation chromatography curves (GPC) (polyethylene glycol references) for three representative copolymers of the invention, PPO-b-poly (SBMA) diblock copolymers prepared by ATRP at 20° C.: copolymer A, $M_n$=6490, $M_w/M_n$=1.232; copolymer B, $M_n$=11183, $M_w/M_n$=1.255; and copolymer C, $M_n$=15114, $M_w/M_n$=1.353;

FIG. 13 is a graph illustrating fibrinogen adsorption (SPR measurements) on surfaces coated with physically adsorbed PPO-b-poly(SBMA) as a function of PPO-b-poly(SBMA) concentration in solution ($C_{PPO-b-poly(SBMA)}$) for three representative copolymers of the invention (copolymers A, B, and C) at 25° C.;

FIG. 14 are SPR sensorgrams for fibrinogen adsorption at 25° C. onto surfaces coated with representative copolymers of the invention with $C_{PPO-b-poly(SBMA)}$=1.0 mg/ml (A: copolymer A, B: copolymer B, C: copolymer C, C+A: copolymer C backfilled with copolymer A) (final SPR wavelength shift for each is indicated in parentheses, 1 nm wavelength shift in the SPR response is equivalent to 15 ng/cm$^2$ adsorbed proteins;

FIG. 15 is a schematic illustration showing the adsorption of copolymer C onto the $CH_3$-terminated SAM surface and back-filling with copolymer A to achieve increased poly(sulfobetaine) surface density and increased resistance to protein adsorption;

FIG. 16 is a SPR sensorgram illustrating the adsorption of several proteins (fibrinogen, bovine serum albumin (BSA), and lysozyme) on a representative surface of the invention (copolymer A-coated surfaces) (final wavelength shift for each is indicated in parentheses, 1 nm wavelength shift in the SPR response is equivalent to 15 ng/cm$^2$ adsorbed proteins;

FIG. 17 is a bar graph comparing protein adsorption (determined by enzyme-linked immunosorbent assay (ELISA) on representative poly(sulfobetaine) materials on glass: poly (sulfobetaine) prepared by ATRP (SBMA ATRP); a representative poly(sulfobetaine) hydrogel of the invention (SBMA Hydrogel), a representative poly(sulfobetaine) coating (SBMA Coating), and a comparative epoxy primer coating (Epoxy Primer);

FIG. 18 is a bar graph comparing Ulva spore settling as a function of time (1, 3, and 6 hours) uncoated glass (Glass), epoxy primer coating (Ref), a representative poly(sulfobetaine)/epoxy coated surface (glass) of the invention (SBMA/Epoxy Coating), prepared as described in Example 5, and poly(sulfobetaine) prepared by ATRP (SBMA ATRP);

FIGS. 19A and 19B compare the growth of sporelings on a representative poly(sulfobetaine)/epoxy coated surface of the invention (FIG. 19B) and an epoxy primer coated surface (FIG. 19A);

FIGS. 20A-20C compare the sporeling strength of attachment on glass (FIG. 20A), an epoxy primer coated surface (FIG. 20B), and a representative poly(sulfobetaine)/epoxy coated surface of the invention (FIG. 20C) after exposure to 200 kPa water pressure from a water jet spraying water onto the central regions of the slides;

FIG. 21 is a bar graph comparing the average percentage of juvenile *H. elegans* remaining on a representative poly(sulfobetaine)/epoxy coated surface of the invention (SBMA/Epoxy Coating) and a biofilm reference (Biofilm), coatings were exposed to a wall shear stress equivalent to 100 Pa for four minutes;

FIG. 22 is a graph illustrating relative human fibrinogen adsorption on various material surfaces determined from ELISA with polystyrene (PS) as a reference: SPU (unmodified), segmented polyurethane film; IPN-I, an IPN film prepared by incubating a SPU film in a methanol solution containing a SBMA monomer ratio of 70 mol %, an incubation concentration of 1.0 mol/L for 24 hours at 20° C.; IPN-II, an IPN film prepared by incubating a SPU film in a solution containing a SBMA monomer ratio of 70 mol %, an incubation concentration of 2.0 mol/L and a mixed solvent of 95 vol % methanol and 5 vol % water for 24 hours at 20° C.; HEMA hydrogel, 2-hydroxyethyl methacrylate hydrogel; and SBMA Hydrogel, a representative poly(sulfobetaine) hydrogel (sulfobetaine methacrylate) of the invention;

FIG. 23A is a graph comparing relative protein adsorption on representative interpenetrating polymer networks of the invention as a function of incubation time for three solvents: methanol (o); mixed ethanol/methanol of 1/1 volume ratio (Δ); and mixed isopropanol/methanol of 1/1 volume ratio (□) with an incubation concentration of 0.5 mol/L and a SBMA monomer ratio of 70 mol % at 20° C.; and FIG. 23B is a graph comparing swelling ratio of the SPU film for the corresponding IPN films;

FIG. 24 is a graph illustrating relative protein adsorption on representative interpenetrating polymer networks of the invention as a function of incubation concentration in a methanol solution with a SBMA monomer ratio of 70 mol % for 24 hours at 20° C.;

FIG. 25A is a graph comparing relative protein adsorption on representative interpenetrating polymer networks of the invention as a function of incubation time in a methanol solution with a SBMA monomer ratio of 70 mol % at 20° C. and an incubation concentration of 0.5 mol/L or 1.0 mol/L; and FIG. 25B is a graph comparing swelling ratio and weight gain of the corresponding dry IPN films;

FIG. 26 is a graph illustrating relative protein adsorption on representative interpenetrating polymer networks of the invention as a function of SBMA monomer ratios (mol %) with an incubation concentration of 1 mol/l for 24 hour at 20° C.;

FIG. 27 compares Raman spectra for the IPN-I film at 0 and 20 μm from the surface as compared to that of an unmodified SPU film;

FIG. 28 is a graph comparing the adsorption of several proteins (fibrinogen, lysozyme, and hCG) to a representative surface of the invention (a poly(carboxybetaine) coated surface) obtained by surface plasmon resonance (SPR) measurements (wavelength shift as a function of time): adsorption of 1 mg/mL fibrinogen, 1 mg/mL lysozyme, and 20 μg/mL hCG from PBS (150 mM and pH 7.4);

FIG. 29 is a schematic illustration of a method for preparing a representative surface of the invention, surface grafting by ATRP from the glass surface silanized with initiator to provide poly(sulfobetaine) or poly(carboxybetaine) coated surface;

FIGS. 30A-30D are images comparing endothelial cell adhesion on tissue culture polystyrene (TCPS) (FIGS. 30A and 30B) and a representative poly(sulfobetaine) hydrogel of the invention (Poly(SBMA) hydrogel) (FIGS. 30C and 30D) in 10% fetal bovine serum (FBS), FIGS. 30A and 30C are after 1 day and FIGS. 30B and 30D are after five days; and FIG. 31 is an illustration of the chemical structure and the $^1$H-NMR spectra of the carboxybetaine methacrylate (CBMA) monomer useful in making the poly(carboxybetaine) materials of the invention.

DETAILED DESCRIPTION OF THE INVENTION

The present invention provides low fouling surfaces, materials useful in making low fouling surfaces, methods for making low fouling surfaces, and methods for using low fouling surfaces. The low fouling surfaces include sulfobetaine and carboxybetaine materials.

The present invention provides super-low fouling surfaces are provided. As used herein, the terms "low fouling surface" and "super-low fouling surface" refer to a surfaces that resist protein adsorption. Super-low fouling surfaces that are resistant to protein adsorption are also resistant to cell adhesion, adhesion of bacteria and other microorganisms, and biofilm formation.

The super-low fouling surfaces of the invention are surfaces that have been treated with one or more materials to render the surface super-low fouling. Suitable materials useful for treating surfaces to provide super-low fouling surfaces include zwitterionic materials. Zwitterionic materials are electronically neutral materials that typically include equal amounts of positive charges and negative charges. Representative zwitterionic materials useful in making the super-low fouling surfaces of the invention include sulfobetaine materials (sulfate negative charge and ammonium positive charge) and carboxybetaine materials (carboxy negative charge and ammonium positive charge).

In one aspect, the present invention provides a substrate having a surface coated with a sulfobetaine or carboxybetaine material. The substrate has a surface having a monolayer of a sulfobetaine or a carboxybetaine material thereon. The surface is covered with at least one full monolayer of the sulfobetaine or carboxybetaine material. The monolayer can be a self-assembled monolayer.

The advantages of the surface of the invention arise from well-controlled density of the sulfobetaine or carboxybetaine material. Well-controlled density of surface coating materials is a feature of the surfaces of the invention. The well-controlled density of coating materials imparts low-fouling characteristics to the surface. As used herein, the term "well-controlled density" describes a surface coated with at least one full monolayer of coating molecules and substantially lacking defects (i.e., no single defect is larger than about 1 $nm^2$). As used herein, the term "defect" is defined as the area on the surface that is not covered by a nonfouling coating material (e.g., nonfouling groups). In general, when there is a layer of material on a surface, defect size relates to the surface's resistance to protein adsorption: the smaller the size of the defect, the greater the protein resistance. Representative super-low fouling surfaces of the invention with well-controlled density include defects in which no single defect is greater than about 1 $nm^2$ (i.e., each single defect is less than about 1 $nm^2$).

The super-low fouling surfaces of the invention have well-controlled density of sulfobetaine or carboxybetaine coating materials. The surfaces of the invention are resistant to protein adsorption. One measure of the protein adsorption resistant, super-low fouling surfaces of the invention is the amount of fibrinogen that adsorbs to the surface per unit area. The surface of the invention has a fibrinogen adsorption less than about 30 $ng/cm^2$. In one embodiment, the surface has a fibrinogen adsorption less than about 10 $ng/cm^2$. In one embodiment, the surface has a fibrinogen adsorption less than about 5 $ng/cm^2$. In one embodiment, the surface has a fibrinogen adsorption less than about 0.3 $ng/cm^2$.

Representative low fouling surfaces of the invention have a fibrinogen adsorption less than about 30 $ng/cm^2$. In one embodiment, surfaces coated with a sulfobetaine material have a fibrinogen adsorption less than about 30 $ng/cm^2$. In another embodiment, surfaces coated with a sulfobetaine material have a fibrinogen adsorption less than about 10 $ng/cm^2$. In another embodiment, surfaces coated with a sulfobetaine material have a fibrinogen adsorption less than about 5 ng/cm². In another embodiment, surfaces coated with a sulfobetaine material have a fibrinogen adsorption less than about 0.3 ng/cm². In one embodiment, surfaces coated with a carboxybetaine material have a fibrinogen adsorption less than about 30 ng/cm². In another embodiment, surfaces coated with a carboxybetaine material have a fibrinogen adsorption less than about 10 ng/cm². In another embodiment, surfaces coated with a carboxybetaine material have a fibrinogen adsorption less than about 5 ng/cm². In another embodiment, surfaces coated with a carboxybetaine material have a fibrinogen adsorption less than about 0.3 ng/cm².

In one embodiment, the sulfobetaine material is a poly (sulfobetaine). The sulfobetaine material can be prepared from one or more monomers selected from the group consisting of sulfobetaine acrylates, sulfobetaine acrylamides, sulfobetaine vinyl compounds, sulfobetaine epoxides, and mixtures thereof.

In one embodiment, the carboxybetaine material is a poly (carboxybetaine). The carboxybetaine material can be prepared from one or more monomers selected from the group consisting of carboxybetaine acrylates, carboxybetaine acrylamides, carboxybetaine vinyl compounds, carboxybetaine epoxides, and mixtures thereof.

In one embodiment, the sulfobetaine material is a diblock copolymer comprising a poly(sulfobetaine). In one embodiment, the diblock copolymer comprises poly(propylene oxide).

In one embodiment, the sulfobetaine material is an interpenetrating polymer network. In one embodiment, the carboxybetaine material is an interpenetrating polymer network. The interpenetrating polymer network can include a polymer selected from the group consisting of a polyurethane, a silicone, a polyester, a polyethylene, and a polyamide.

In one embodiment, the sulfobetaine material is a polymer blend comprising at least one of a poly(sulfobetaine) or a poly(carboxybetaine).

A variety of surfaces may be rendered super-low fouling using the materials and methods described herein. Representative surfaces that can be rendered super-low fouling include metal and metal oxide surfaces, ceramic surfaces, synthetic and natural polymeric surfaces, glass surfaces, fiber glass surface, silicon/silica surfaces, and carbon-based material surfaces. Representative natural polymeric surfaces include collagen, fibrins, and other carbohydrate surfaces suitable for the use of tissue engineering. Representative carbon-based material surfaces include carbon fiber, nanotube, and bulky ball surfaces.

In another aspect of the invention, materials useful for making super-low fouling surfaces are provided. Suitable materials include zwitterionic materials that, when applied to a surface (e.g., covalently coupled to the surface or physically adsorbed to the surface), render the surface protein adsorption resistant.

As used herein, the term "polymer blend" refers to two or more polymer chains having constitutionally or configurationally different features in intimate combination. Two or more polymers are physically mixed with to form a polymer blend.

Representative zwitterionic materials include polymers derived from zwitterionic monomers. Suitable materials useful in the invention include sulfobetaine polymers and carboxybetaine polymers. Sulfobetaine polymers include sulfobetaine units and can be made by polymerizing suitably reactive sulfobetaine monomers. Carboxybetaine polymers include carboxybetaine units and can be made by polymerizing suitably reactive carboxybetaine monomers.

The surfaces of the invention are coated with sulfobetaine and carboxybetaine polymer materials.

Sulfobetaine Polymers

Sulfobetaine polymers are grafted to a layer (e.g., a monolayer, such as a self-assembly monolayer) terminated with initiators through atom transfer radical polymerization (ATRP). The substrate surface is coated with the layer terminated with initiators. Then, sulfobetaine monomers are polymerized onto the layer to form a layer of sulfobetaine polymer coating on the substrate surface. The atom transfer radical polymerization is initiated by the radical initiator at the terminus of the layer.

In one embodiment, sulfobetaine polymers are grafted from self-assembly monolayers (SAMs) terminated with initiators through atom transfer radical polymerization (ATRP). The substrate surface is coated with the SAMs terminated with radical initiator. Then, sulfobetaine monomers are polymerized onto the SAMs to form a layer of sulfobetaine polymer coating on the substrate surface. The atom transfer radical polymerization is initiated by the radical initiator at the terminus of the SAMs.

The radical terminated SAMs can be formed by one-step or two-step methods. In a one-step method, an initiator SAM is formed by attaching radical initiator-terminated molecules to the surface through covalent or noncovalent bonding. In a two-step method, a functional group-terminated SAM is formed by attaching functional group-terminated molecule to the surface through covalent or noncovalent bonding. The functional group-terminated SAM is subsequently converted to the initiator-terminated SAM by chemical reaction. Polymerization of sulfobetaine monomers on the surface with immobilized initiators form a layer of sulfobetaine polymers on the surface. The syntheses of representative initiator-terminated SAM and hydroxy-terminated SAM are described in Example 1 and illustrated in FIG. 1. The grafting of representative sulfobetaine polymers onto the initiator-covered surface is described in Example 2 and illustrated FIG. 2.

Superlow fouling surfaces are achieved after well-controlled initiator formation and growing polymer chains from substrate surfaces by the use of living polymerization techniques. Although representative methods are described as having specific components, it will be appreciated that the substrate surface of the invention can be a variety of surfaces, the functional-group terminated SAMs can be any functional groups suitable for the purpose of converting to radical initiators, the initiator-terminated SAMs on the surface can be a variety of radical initiators, and the coating materials of the invention can include a variety of sulfobetaine polymers.

Surfaces used in describing the invention include gold-coated substrate surfaces and glass surfaces. It will be appreciated that other surfaces can be used in the methods of the invention to provide the surface of the invention.

Figure 1:
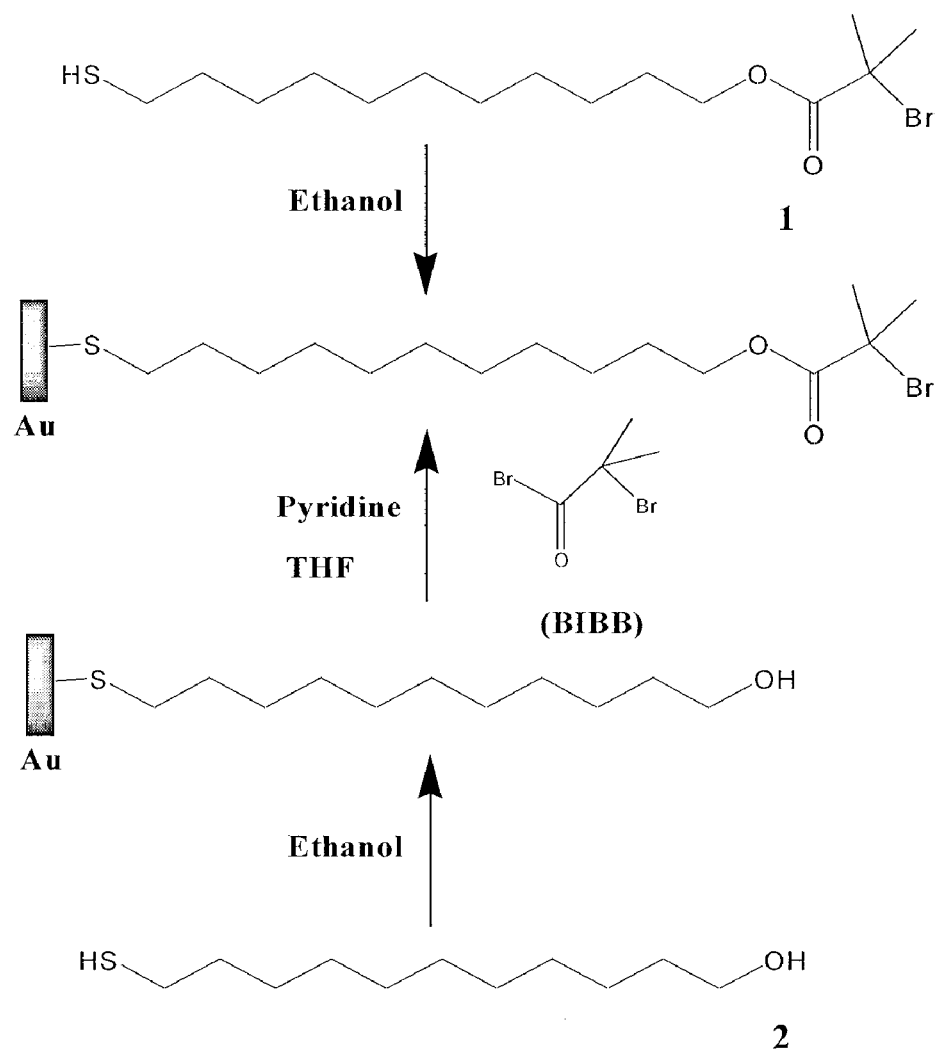
FIG. 1 is a schematic illustration of two methods (one-step and two-step methods) for preparing initiator terminated self-assembly monolayers (SAMs) on a surface (gold)

Two methods can be used to immobilize ATRP initiators onto substrate surfaces as shown in FIG. 1. One approach is to prepare an initiator terminated thiol and to form an initiator-terminated SAM from a thiol onto the substrate surface. The other approach is to form a hydroxyl-terminated SAM from a mercapto-alcohol onto the substrate surface, then the initiator groups were then grafted onto the surface via the reaction of an alkyl halide with the hydroxyl group. The polymerization of sulfobetaine monomer, N-(3-sulfopropyl)-N-(methacryloxyethyl)-N,N-dimethylammonium betaine (SBMA), on radical initiator-terminated SAM surfaces can be carried out at room temperature, the reaction media can be water or other polar solvents, and the molecular weight of the product sulfobetaine polymer is controllable.

After the polymerization of SBMA through ATRP, protein adsorption was greatly decreased to less than 0.02 nm (0.1% ML or 0.3 ng/cm$^2$ of fibrinogen adsorption) (see FIG. 5A). Lysozyme and bovine serum albumin (BSA) adsorption was also measured by surface plasmon resonance (SPR) and found to be at a level similar to fibrinogen adsorption. By the method, a super-low fouling surface covered with well-controlled poly(SBMA) brushes was achieved. The substrates grafted with poly(SBMA) are stable evidenced by the fact the poly(SBMA) coated surfaces prepared as described in the Example were left in air or immersed in water at room temperature for more than one month without loss of their super-low fouling properties.

The quality of the initiator SAM is important to subsequent surface polymerization and protein adsorption. The amount of unbound initiator on the surface affects fibrinogen adsorption. (FIG. 6) The treatment of the initiator SAM with appropriate solvents is necessary to achieve superlow fouling surfaces. SAMs in the example were prepared by soaking gold-coated substrates in pure ethanol solution of thiols at room temperature after careful cleaning of the surface. The percentage of unbound initiators on the surfaces is proportional to the concentration of initiator solutions. A significant amount of unbound thiol molecules were found if the initiator SAM was washed only with pure ethanol as for the preparation of most SAMs. These unbound thiol molecules were completely removed if the initiator SAM was rinsed with ethanol followed by THF because THF is a better solvent for the thiol molecule 1 (see FIG. 1) than ethanol. Atomic force microscopy (AFM) images show that the surface is featureless for the initiator SAM on gold, except for defects and domains from the gold substrate, indicating a homogenous monolayer without unbound thiol molecules on the gold surface (FIG. 7).

After surface polymerization, the thickness of the polymer ranges from 12 nm to too thick to be measured accurately by ellipsometry. FIG. 8 shows the difference in wavelength shift from SPR for fibrinogen adsorption on these two polymerized surfaces with different polymer thickness. The thicker polymer layer initiated from the surface with unbound thiols leads to some fibrinogen adsorption (0.9 nm shift in wavelength), corresponding to a 6% ML of adsorbed fibrinogen. The polymer layer initiated from the surface without unbound initiators has very low protein adsorption. Unbound thiol molecules can cause the formation of a thick polymer film. It is believed that strong intermolecular interactions among zwitterionic groups via intra- and interchain ionic contacts lead to dehydration within the thick polymer film and thus protein adsorption.

Sulfobetaine polymer brushes grew rapidly. FIG. 8 shows polymer thickness as a function of polymerization time for different SBMA concentrations. For reaction with a SBMA concentration of 0.1 M, the thickness of the polymer film increased rapidly at the beginning of the reaction and leveled off at about 8 nm, at which a termination might occurs. Reaction with a SBMA concentration of 0.3M leveled off at about 12 nm (FIG. 8). Reactions with higher concentrations lead to thick and uneven polymer films on surfaces. A longer reaction time may even result in gelation throughout the solution, which makes it difficult to measure film thickness by ellipsometry. Copper bromide/bipyridine (CuBr/BPY) complex was used to catalyze the polymerization. FIG. 8 also shows fibrinogen adsorption on poly(SBMA)-covered surfaces measured by SPR. It is shown that all the surfaces with polymer film thickness ranging from 5 to 12 nm highly resist fibrinogen adsorption.

Representative monomers for making sulfobetaine polymers useful in the invention include sulfobetaine methacrylate (SBMA), sulfobetaine acrylates, sulfobetaine acrylamides, sulfobetaine vinyl compounds, sulfobetaine epoxides, and other sulfobetaine compounds with hydroxyl, isocyanates, amino, or carboxylic groups.

The representative polymerization methods are atom transfer radical polymerization (ATRP), reversible addition fragmentation chain transfer (RAFT) polymerization, and free radical polymerization. Any conventional radical initiators for polymerization may be used to practice the current invention. The representative initiators for normal thermal or photochemical free radical polymerization include benzoyl peroxide, 2,2'-azo-bis(2-methylproionitrile) and benzoin methyl ether. Representative initiators for ATRP include alkyl halides, such as bromoisobutyryl bromide (BIBB). Representative initiators for RAFT polymerization (i.e., free radical initiators with chain reversible agency (CTA)) include thiocarbonylthio compounds.

In one embodiment, well-defined diblock copolymers containing sulfobetaine moieties, such as poly(SBMA), with a hydrophobic moiety, such as poly(propylene oxide) (PPO), are adsorbed onto surfaces coated with alkyl-terminated SAMs, such as methyl ($CH_3$)-terminated SAMs. For this embodiment, the hydrophobic polymer segment binds to the hydrophobic surface and the hydrophilic sulfobetaine moiety is exposed to the solution. The syntheses of representative well-defined diblock copolymers containing sulfobetaines are described in Example 3 and illustrated in FIG. 9.

In addition to surfaces coated with suitable SAMs, surfaces coated with other hydrophobic materials (or hydrophobic surfaces) can be used for adhering the copolymers of the invention to those surfaces.

Super-low fouling surfaces are achieved after absorption of diblock copolymers on substrate surfaces. Although representative methods are described as having specific components, it will be appreciated that the substrate surface of the invention can be a variety of surfaces, the $CH_3$-terminated SAMs on the surface can be a variety of SAMs terminated with hydrophobic groups, the diblock copolymers of the invention can be composed of a variety of sulfobetaine-based hydrophilic portions having varied length and any suitable hydrophobic portion with varied length, and the diblock copolymers can be prepared by any suitable methods of polymerization.

As depicted schematically in FIG. 9, the copolymerization of a diblock copolymer is a reversible redox process through which a transition metal compound acts as a carrier of a halogen atom to sequentially link monomer to a nonfunctional macro-initiator. In the synthesis, PPO with a macro-initiator (PPO-Br) was synthesized by reacting monohydroxy-based poly(propylene glycol) with 2-bromoisobutyrylbromide. For the polymerization of SBMA with 11200 molecular weight, sulfobetaine monomer (SBMA) was polymerized in the presence of PPO-Br and catalysis CuBr to afford the copolymer. The structure of PPO-b-poly(SBMA) diblock copolymers was characterized by $^1$H nuclear magnetic resonance (NMR) spectroscopy. A typical spectrum for $PO_{20}$-b-$SBMA_{35}$ is shown in FIG. 10.

Methyl-terminated SAMs were formed on to gold-coated glass substrates by soaking clean gold-coated substrates in a solution of $HS(CH_2)_8CH_3$. PPO-b-poly(SBMA) diblock copolymer solution was then flowed over the substrate surface, followed by flushing with buffer solution to remove loosely adsorbed copolymers. In this example, fibrinogen was used as a model system to evaluate protein adsorption on surfaces covered with physically adsorbed copolymers. The amount of protein adsorption is defined as the difference between the two baselines established before and after protein adsorption. FIG. 11 shows a typical SPR sensorgram for the adsorption of the copolymer A, followed by the in situ evaluation of fibrinogen adsorption.

The physical adsorption of well-defined diblock copolymers PPO-b-poly(SBMA) onto hydrophobic $CH_3$-SAM surfaces was performed. To control the surface packing density of physically adsorbed copolymers, three different SBMA-based block copolymers (referred to as $PO_{20}$-b-$SBMA_{20}$, $PO_{20}$-b-$SBMA_{35}$, and $PO_{20}$-b-$SBMA_{50}$) were synthesized. The chain lengths of poly(SBMA) were controlled by the sequential monomer addition via ATRP at ambient temperature while the chain length of PPO was kept constant. Synthesis parameters and average molecular weights for the three PPO-b-poly(SBMA) copolymers are summarized in Table 1.

TABLE 1

Reaction Conditions and Average Molecular Weights of Three PPO-b-poly(SBMA) Copolymers

| Sample | Composition $(DP_n^b)$ | Solvent (10 ml) | [SBMA] (g) | [PPOBr] (mg) | Reaction time (hr) | $M_{n,GPC}{}^c$ | $M_w/M_n{}^c$ |
|---|---|---|---|---|---|---|---|
| A | $PO_{20}$-$SBMA_{20}$ | MeOH | 2.0 | 358.0 | 24 | 6490 | 1.232 |
| B | $PO_{20}$-$SBMA_{35}$ | MeOH | 2.0 | 143.2 | 24 | 11183 | 1.255 |
| C | $PO_{20}$-$SBMA_{50}$ | MeOH | 2.0 | 71.6 | 24 | 15114 | 1.353 |

$^a$The ratio of initiator:Cu(I)Br:bpy was 1:1:2.
$^b DP_n$ is the degree of polymerization.
$^c M_n$ is the average molecular weight and $M_w/M_n$ is the polydispersities of the prepared copolymers When the poly(SBMA) chain is longer, the chain length ratio of poly(SBMA)/PPO is higher and the structure of diblock copolymer is less symmetric. This two-step reaction route (FIG. 9) provided PPO-b-poly(SBMA) copolymers with controlled molecular weights ($M_n$) and polydispersities ($M_w/M_n$=1.2-1.35). Low polydispersities indicate that well-controlled polymerization accuracy. FIG. 12 shows the molecular weight of the three copolymers obtained ranges from 6500 to 15000 with low polydispersity. Copolymers $PO_{20}$-b-$SBMA_{20}$, $PO_{20}$-b-$SBMA_{35}$, and $PO_{20}$-b-$SBMA_{50}$ are denoted as copolymers A, B, and C, respectively, in FIG. 12. It is expected that three SBMA-based block copolymers have different packing densities and protein adsorption behaviors. The adsorbed amounts of both copolymers and proteins were obtained from SPR.

The effect of PPO-b-poly(SBMA) solution concentration from 0.005 to 1 mg/mL on surface packing densities and thus protein adsorption were determined. As can be seen from FIG. 13, protein adsorption depends on the chemistry and structure of the layer, namely SBMA surface density and (SBMA)/PPO ratio, which are determined by (a) the concentration of PPO-b-poly(SBMA) in solution ($C_{PPO-b-poly(SBMA)}$) and (b) the volume fraction of poly(SBMA) [$f_{poly(SBMA)}$]. At low $C_{PPO-b-poly(SBMA)}$ (e.g., $C_{PPO-b-poly(SBMA)}$ is less than 0.02 mg/ml), protein adsorption is lower for PPO-SBMA diblock copolymers of higher $f_{poly(SBMA)}$ due to the higher surface SBMA coverage. In contrast, at higher $C_{PPO-b-poly(SBMA)}$, protein adsorption on PPO-b-poly(SBMA) diblock copolymers of lower $f_{poly(SBMA)}$ quickly decreases. For copolymer A, which has a lower molecular weight, protein adsorption is very low (3 ng/cm$^2$) when $C_{PPO-b-poly(SBMA)}$ is greater than 0.03 mg/ml. For copolymer C, protein adsorption remains at a higher level (20.3 ng/cm$^2$) over a wide range of $C_{PPO-b-poly(SBMA)}$. Although not wanting to be limited by the hypothesis, it is believed that this is because the larger SBMA segments create cavities among themselves and can not fully cover the surface, leading to protein adsorption.

The surface packing density of PPO-b-poly(SBMA) plays a significant role in surface resistance to protein adsorption. FIG. 14 shows SPR sensorgrams for fibrinogen adsorption on various PPO-b-poly(SBMA) coated surfaces for $C_{PPO-b-poly(SBMA)}$=1.0 mg/ml. Fibrinogen adsorption is very low on surfaces covered with copolymers A and B and higher on copolymer C surfaces. This is due to increased surface packing defects formed from the large molecular size of copolymer C. When the surface covered with copolymer C was back-filled with the smaller molecular weight copolymer A (illustrated in FIG. 15), very low protein adsorption was also achieved. This result indicates that higher fibrinogen adsorption is due to higher surface vacancies caused by the adsorption of the copolymer with higher molecular weight and these cavities can be back-filled with copolymers of smaller molecular weights.

Copolymers containing SBMA are ideal for resisting protein adsorption if the surface SBMA density is high. SBMA-based copolymers resistance to the adsorption of various proteins were further evaluated by measuring the adsorption of three proteins, fibrinogen, BSA, and lysozyme, with varying molecular weight (14.3 kD-340 kD) and pI (4.8-10.9) on copolymer A. FIG. 16 shows that the adsorption of all three proteins on copolymer A is lower than 0.25 nm (about 3.75 ng/cm$^2$).

For the block copolymers, representative monomers for sulfobetaine moiety include sulfobetaine methacrylate (SBMA), sulfobetaine acrylates, sulfobetaine acrylamides, sulfobetaine vinyl compounds, sulfobetaine epoxides, and other sulfobetaine compounds with hydroxyl, isocyanates, amino, or carboxylic groups. Any hydrophobic polymer chains could be used as the hydrophobic moiety for the copolymer of the invention. Representative hydrophobic moieties include poly(propylene oxide) (PPO), polymethacrylates, polyacrylates, polyacrylamides, polyesters, polyethers, polyurethanes, and polyamides.

In one embodiment, a poly(SBMA) coating was prepared as described in Example 5. This example illustrates the preparation of a polySBMA that can be used alone or added to normal paint to reduce biofouling or increase biocompatibility. The polymer was prepared by reacting SBMA and AIBN, followed by addition of lauryl methacrylate. The product was filtered and dispersed in xylene with a concentration of 99 g/L. An enzyme-linked immunosorbent assay (ELISA) showed a greater than 80% reduction in protein adsorption on polySBMA coated surfaces (results shown in FIG. 17). Marine biofouling assays showed that polySBMA coatings significantly reduced settling of marine microorganisms (see FIGS. 19-21).

The polySBMA, prepared as described in Example 5, can be added to epoxy-based paint to reduce biofouling. The components in a representative formulation are provided in Table 2.

TABLE 2

Representative poly(SBMA) coating formulation.

| Component | Amount |
|---|---|
| Poly(SBMA) dispersion | 20 g |
| Epoxy resin | 100 g |
| $TiO_2$ | 20 g |
| $Fe_2O_3$ | 3 g |
| Carbon black | 1 g |
| Solvents | 30 g |
| Additives | 1 g |
| Crosslinker | 50 g |

The polySBMA dispersion is a polySBMA in xylene at concentration of 99 g/L, epoxy resin is 70-80% epoxy solution, and $TiO_2$, $Fe_2O_3$, and carbon black are pigments. In this formulation, the additive is comprised of an organo-clay structuring agent, silica thixotropic agent. The crosslinker is a polyamide that reacts with epoxy resin at ambient temperature. The liquid nonfouling coating is coated on epoxy primer substrates by brush or spray. ELISA showed a significant reduction in fibrinogen adsorption and *H. elegans* settling is reduced by more than 50%.

Interpenetrating Polymer Networks

In another aspect, the invention provides a super-low fouling surface coated with an interpenetrating polymer network (IPN). As used herein, the term "interpenetrating polymer network" (IPN) refers to a polymer comprising two or more networks that are at least partially interlaced on a molecular scale, but not covalently bonded to each other, and cannot be separated unless chemical bonds are broken.

In one embodiment, interpenetrating polymer networks (IPN) containing a sulfobetaine polymer are provided by penetrating sulfobetaine monomer into a matrix of a second material and polymerizing the monomers. The second materials can be the same as or different from the penetrating compound. Representative IPNs containing a sulfobetaine polymer and a segmented polyurethane (SPU) is described in Example 6 and illustrated in FIG. 3.

Interpenetrating polymer networks (IPNs) that resist protein adsorption and have high mechanical strengths were prepared by modifying segmented polyurethane (SPU) with a crosslinked sulfobetaine methacrylate (SBMA) polymer. SPU was used as the matrix component to reinforce the mechanical strength of the IPN film and poly(SBMA) was used to reduce the protein adsorption of the IPN film. As shown in FIG. 3, the SPU film was prepared with the solvent evaporation method. The SPU film was then immersed in an incubation solution containing SBMA monomer, 2-ethylhexyl methacrylate (EHMA) monomer, glycol 1,3-diglycerolate diacrylate (GDGDA) crosslinker, and photoinitiators. SBMA polymerization was initiated via photo-polymerization with visible light irradiation to create an IPN film.

The total concentration of the incubation solution (or incubation concentration) was adjusted in order to obtain the optimal results. SBMA monomer ratio (mol %) is defined as the moles of SBMA monomer divided by the total moles of SBMA and EHMA monomers in the incubation solution. In the example, the SBMA monomer ratio was adjusted between 0 and 100 mol % to optimize preparation conditions for IPNs and GDGDA was fixed at $1.0 \times 10^{-2}$ mol/L. To eliminate side reactions, photoinitiators (e.g., camphorquinone and ethyl 4-(N,N-dimethylamino) benzoate) were added into the incubation solution in the presence of nitrogen in the dark. For photo-polymerization, the SPU film was irradiated with visible light ($\lambda$=400-500 nm) to form IPN film. The IPN film was then cleaned according to well established work-up procedure known in the art to remove unreacted monomers. The chemical composition depth profile of the IPN film was determined by confocal Raman microscopy. The amount of adsorbed proteins on the IPN film was determined by an enzyme-linked immunosorbent assay (ELISA).

The process for IPN preparation can be generally divided into two stages. The first stage is associated with shorter incubation times. In this stage, the amount of poly(SBMA) diffusing into the SPU matrix from the incubation solution is mainly controlled by the degree of SPU swelling. The second stage is associated with longer incubation times. In this stage, the amount of poly(SBMA) within the SPU matrix is determined by SBMA solubility within the SPU film. Thus, it is expected that solvent polarity plays a very important role in IPN preparation and there is a trade-off in solvent polarity. Incubation in less polar solvent will cause higher SPU swelling (or higher SBMA diffusion into the matrix or lower protein adsorption) initially. However, it will also have lower SBMA solubility within the SPU film (or less SBMA-rich domains within the SPU matrix or higher protein adsorption) after long-time incubation. The incubation solution should be capable of both swelling hydrophobic SPU and dissolving hydrophilic poly(SBMA) and an appropriate solvent polarity is needed to achieve the best performance of IPN films.

The amount of adsorbed proteins on the IPN film depends on incubation conditions, including solvent polarity, incubation time, SBMA monomer ratio, and incubation concentration. It appears that IPNs prepared in a mixed solvent of higher polarity with long incubation time have very low protein adsorption, indicating that the IPNs containing poly (SBMA) can be highly resistant to nonspecific protein adsorption when the distribution of SBMA units within the SPU film is well controlled.

Protein adsorption on each IPN film prepared was evaluated by ELISA using polystyrene (PS) as a reference substrate. Relative protein adsorption for various samples with respect to that on PS is shown in FIG. 22. Referring to FIG. 22, protein adsorption on IPN films is significantly reduced as compared with that on PS or the unmodified SPU film. The adsorbed human Fg on the unmodified SPU film is 82% of that on PS. Protein adsorption on the IPN films is similar or even lower than on poly(HEMA) hydrogel, while the IPN films have much better mechanical properties than poly (HEMA). The IPN film with the lowest protein adsorption was achieved by incubating a SPU film (TECOFLEX 60) in a solution containing 95 vol % methanol and 5 vol % water for 24 hours at 20° C., the SBMA monomer ratio of 70 mol %, and an incubation concentration of 2.0 mol/L. Poly(SBMA) hydrogel was also used for comparison. It can be seen that the relative protein adsorption on poly(SBMA) is only 1.5%, indicating that poly(SBMA) can highly resist nonspecific protein adsorption. Results show that IPNs containing poly (SBMA) and SPU are an excellent approach for achieving low protein adsorption while maintaining mechanical strength.

The resistance of IPNs to nonspecific protein adsorption strongly depends on the polarity of the solvent used in their preparation. The ability of IPN samples to resist nonspecific protein adsorption is determined by the balance between the degree of SPU swelling and the solubility of SBMA within the SPU film. For long incubation times, the resistance of IPNs to nonspecific protein adsorption is mainly determined by SBMA solubility within the SPU film. A more polar solvent is preferred to prepare IPN samples with lower protein adsorption. After the SPU film is swelled over long incubation times by more polar solvents containing highly polar SBMA, more SBMA can penetrate into the SPU film and form SBMA-rich domains within the SPU matrix. For short incubation times, reduction in protein adsorption on IPNs is mainly determined by the degree of SPU swelling. A less polar solvent will swell SPU films more and allow more SBMA to diffuse into the film, leading to reduction in protein adsorption initially. In the example, the effects of solvent polarity on the reduction in protein adsorption on prepared IPN films were studied mainly using three types of incubation solutions in the order of decreasing polarity: methanol greater than ethanol/methanol, which is greater than isopropanol/methanol.

As shown in FIG. 23A, less protein adsorption was observed on the IPN film that was incubated in a more polar solvent (i.e., methanol) for 24 hours than those prepared from both less polar mixed solvents (i.e., ethanol/methanol and isopropanol/methanol). It is believed that more SBMA units can be partitioned into the SPU film in a more polar solvent environment during a long incubation period because SBMA monomers dissolve better in the polar solvent (methanol) resulting in the formation of SBMA-rich domains with the SPU matrix to provide better resistance to protein adsorption. Equilibrium between the swelled SPU film and the incubation solution was reached with a long enough incubation time resulting in higher SBMA monomer partition within the SPU film. Thus, a more polar environment is preferred to achieve the formation of SBMA-rich domains within the SPU film to reduce protein adsorption over a long incubation time. This also explains why the IPN film (IPN-II) prepared by the addition of a stronger polar solvent (i.e., 5 vol % water) can further reduce nonspecific protein adsorption as shown in FIG. 22. IPN-II is better than IPN-I, prepared in pure methanol, and HEMA hydrogels. Pure water is not a good solvent for IPN preparation because pure water cannot swell the SPU film. The solvent containing 95 vol % methanol and 5 vol % water appears to be a good compromise between SPU swelling and SMBA solubility.

SPU swelling versus incubation time is compared in FIG. 23B. The results show that less polar solvent (e.g., ethanol/methanol or isopropanol/methanol) initially swells the SPU film more quickly. The swelling ratio (%) during IPN preparation is defined as the difference in diameter between the IPN film prepared and the unmodified SPU film divided by the diameter of the unmodified SPU film. It can be seen that the SPU film was quickly swelled to its maximum amount after 2 hours, when it was soaked in an ethanol/methanol (or isopropanol/methanol) solution. A similar degree of swelling was achieved in the methanol solution, but after 24 hours. The swelling behavior can be correlated with the reduction of protein adsorption. As shown in FIG. 23A, the reduction of protein adsorption is more rapid for the SPU film soaked in an ethanol/methanol (or isopropanol/methanol) solution than in a methanol solution in the first 2 hours. However, the reduction in protein adsorption on the IPN sample prepared in an ethanol/methanol (or isopropanol/methanol) solution is not as significant as that for the sample prepared in a methanol solution after 24 hours. Even though less polar solvent (e.g., isopropanol) can swell the SPU film and penetrate into the SPU matrix much faster, SBMA does not dissolve well in isopropanol-rich domains inside the SPU film. This clearly indicates that not only is the degree of swelling important for more SBMA to penetrate into the SPU film, but also the polarity of the solvent inside the SPU film plays an important role for more SBMA to dissolve within the SPU matrix. More polar solvents can eventually promote SBMA penetration into the SPU matrix after long incubation times, but they have much slower kinetics for the swelling of the SPU films. Thus, appropriate solvents with intermediate polarities are desirable as incubation solutions for IPN preparation to balance between the kinetics and thermodynamics of the IPN process.

The total concentration of the incubation solution can also affect the dispersion of SBMA units within the SPU film. In this example, it is varied between 0.1 and 3.0 mol/L and protein adsorption on various IPN films prepared under different incubation concentrations was evaluated accordingly. As shown in FIG. 23, an effective reduction in protein adsorption of about 1.0 mol/L was observed. For the lower concentrations of the incubation solution (less than 0.5 mol/L), the higher protein adsorption of the IPN film prepared was observed due to the lack of SBMA-rich domains formed within the IPN film. For the IPN film incubated in highly concentrated solutions (greater than 2.0 mol/L), the resistance of the IPN film to protein adsorption was not improved further, due to the change in solvent behavior for a highly concentrated incubation solution containing highly charged SBMA. As shown in FIG. 25A, the IPN films prepared from an incubation solution with a total concentration of 1.0 mol/L reduced protein adsorption more slowly than those prepared from the 0.5 mol/L solution over the first 2 hours because less solvent molecules are available to swell the SPU film and promote SBMA penetration into the SPU film in the case of the 1.0 mol/L solution. However, after incubation for 24 hours, a more effective reduction in protein adsorption was observed for the 1.0 mol/L solution. It is interesting to compare the variation of the swelling ratio and weight gain with the variation of protein adsorption during IPN preparation. The weight gain (%) for an IPN preparation is defined as the difference in dry weight between the IPN film prepared and the unmodified SPU film divided by the dry weight of the unmodified SPU film. It can be seen from FIG. 25B that there is a correlation among the swelling ratio, weight gain, and protein adsorption of the IPN film prepared. The results clearly show that the increase in swelling ratio and weight gain in FIG. 25B correspond to lower protein adsorption in FIG. 25A as the incubation time increases. The results also indicate that the monomer components indeed diffuse into the SPU film and form SBMA-rich domains within the IPN film.

FIG. 26 shows the effects of different SBMA monomer ratios in the incubation solution on protein adsorption onto the IPN films with an incubation time of 24 hours at 20° C. and an incubation concentration of 1 mol/L. Relative protein adsorption decreased with increasing SBMA monomer ratio in the incubation solution. The maximum reduction of protein adsorption occurred when the molar ratio of SBMA to EHMA was 7:3. The results show that the incubation solution with a higher SBMA monomer ratio leads to more poly (SBMA)-rich domains within the IPN film for protein resistance. The results also show that the inclusion of some EHMA units in the solution can enhance the affinity between SPU and poly(SBMA). Thus, the well-controlled molar ratio of SBMA to EHMA is important for the dispersion of SBMA-rich domains within the SPU film and the formation of an excellent IPN structure with very low protein adsorption.

Confocal Raman spectroscopy was used to characterize the IPN film. A typical spectrum is shown in FIG. 27. The S—C chemical bonding from poly(SBMA) was observed at the Raman shift of 605 $cm^{-1}$, which appeared at both 0 and 20 μm depths from the top of the IPN film, while no such shift was observed for the unmodified SPU film indicating that poly (SBMA) indeed penetrated into the SPU film. As noted above, reduction in protein adsorption exhibited a time-dependent behavior (FIGS. 23A and 25A) and there is a correlation between the variation of swell ratio and weight gain (FIG. 25B) to the variation of protein adsorption. For small SBMA molecules at 1M concentration, SBMA physical adsorption should occur rather quickly. These facts along with those from Raman indicate that SBMA does not simply adsorb onto the surface of the SPU films, but penetrates into the SPU matrix.

Representative monomers for sulfobetaine polymers useful in preparing interpenetrating polymer networks include sulfobetaine methacrylate (SBMA), sulfobetaine acrylates, sulfobetaine acrylamides, sulfobetaine vinyl compounds, sulfobetaine epoxides, and other sulfobetaine compounds with hydroxyl, isocyanates, amino, or carboxylic groups. Representative substrates include polyurethane, silicone, polyester, polyethylene, polyamide, and TEFLON.

Carboxybetaine Polymers

In addition to sulfobetaine polymers, carboxybetaine polymers are also useful in making super-low fouling surfaces.

Carboxybetaine polymers are grafted to a layer (e.g., a monolayer, such as a SAM) terminated with initiators through atom transfer radical polymerization (ATRP). The substrate surface is coated with the layer terminated with initiators. Then, sulfobetaine monomers are polymerized onto the layer to form a layer of sulfobetaine polymer coating on the substrate surface. The atom transfer radical polymerization is initiated by the radical initiator at the terminus of the layer.

In one embodiment, the invention provides a coating material based on carboxybetaine polymers, such as poly(carboxybetaine) (e.g., poly(CBMA)). In one method, carboxybetaine polymers with active functional groups are grafted onto a surface coated with initiators via the surface-initiated ATRP method. A representative nonfouling carboxybetaine polymer is described in Example 7 and its preparation illustrated in FIG. 4.

The zwitterionic poly(carboxybetaine) materials are prepared by either grafting a poly(carboxybetaine) polymer onto a surface or by preparing a poly(carboxybetaine)-based hydrogel. The surface or hydrogel coated with poly(carboxybetaine) are highly resistant to protein adsorption or cell adhesion.

A super-low fouling carboxybetaine surface can be prepared by living polymerization techniques to grow poly(carboxybetaine) polymer chains from surfaces in a controlled manner. In the example, a super-low fouling surface was prepared by grafting poly(carboxybetaine methacrylate), poly(CBMA), onto a substrate surface covered with initiators via the surface-initiated ATRP method. ω-Mercaptoundecyl bromoisobutyrate was synthesized by reacting bromoisobutyryl bromide and mercaptoundecanol. The initiators were immobilized on a gold substrate via self-assembly by soaking the gold substrate in a solution containing ω-mercaptoundecyl bromoisobutyrate. One of the CBMA monomers, 2-carboxy-N,N-dimethyl-N-(2'-methacryloyloxyethyl) ethanaminium inner salt, was synthesized by reacting 2-(N,N'-dimethylamino) ethyl methacrylate with β-propiolactone. The CBMA monomers were grafted from radical initiator-terminated SAMs via ATRP. CuBr and 2,2'-bipyridine (BPY) were used as a catalyst and a ligand, respectively. The reaction was kept under mild conditions at room temperature in a mixed solvent of methanol and water. After a typical ATRP polymerization, homogenous carboxybetaine polymer brushes were grafted to the surface. The thickness of the polymer layer was around 10-15 nm as measured by ellipsometry.

The adsorption of three different proteins, human fibrinogen (340 kD, pI=5.5), lysozyme (14 kD, pI=12), and human chorionic gonadotropin (hCG, 37 kD, pI=4.5) on poly (CBMA)-grafted surfaces was shown to decrease to less than 0.3 ng/cm$^2$ (or a wavelength shift is less than 0.02 nm, the detection limit of the SPR sensor) as shown in FIG. 28. Thus, poly(CBMA)-grafted surfaces are highly resistant to protein adsorption.

Representative monomers for making carboxybetaine polymers useful in the invention include carboxybetaine methacrylates, such as 2-carboxy-N,N-dimethyl-N-(2'-methacryloyloxyethyl)ethanaminium inner salt; carboxybetaine acrylates; carboxybetaine acrylamides; carboxybetaine vinyl compounds; carboxybetaine epoxides; and other carboxybetaine compounds with hydroxyl, isocyanates, amino, or carboxylic groups.

The carboxybetaine polymers can be prepared by polymerization methods including atom transfer radical polymerization (ATRP), reversible addition fragmentation chain transfer (RAFT) polymerization, and free radical polymerization. Any conventional radical initiators for polymerization may be used.

Poly(CBMA) or poly(SBMA) can be coated on a glass surface via surface initiated ATRP. Normal glass substrates were cleaned substrates and then immersed in a solution containing 2-bromo-2-methyl-N-3-[(trimethoxysilyl)propyl]-propanamide. The substrates were removed from the dipping solution, rinsed, and dried. SBMA (or CBMA) was polymerized on two substrates with immobilized initiators at the presence of CuBr and 2,2'-bipyridine via surface initiated ATRP. Example 9 describes and FIG. 29 illustrates the preparation of a polySBMA (or polyCBMA) coating on glass slides via surface initiated ATRP.

An enzyme-linked immunosorbent assay (ELISA) showed a significant reduction in protein adsorption on polySBMA (or polyCBMA) grafted surfaces. The adsorbed fibrinogen on polymer grafted glass samples was less than 4% of that on normal glass samples. No algae spore or algae adhesion was found on the polySBMA or grafted surfaces after a 6 hour incubation with green algae spores. The control glass sample was covered with green algae.

In another aspect, the invention provides crosslinked hydrogels. In one embodiment, the invention provides a crosslinked poly(SBMA) hydrogel. In another embodiment, the invention provides a crosslinked poly(CBMA) hydrogel.

A crosslinked poly(SBMA) hydrogel was prepared as described in Example 4. The transparent hydrogel was prepared by adding SBMA monomer into tetraethylene glycol dimethacrylate (TEGDMA) followed by free radical polymerization initiated by sodium metabisulfite and ammonium persulfate. After polymerization, the gel was prepared according to the established procedure in the art to remove residual chemicals. The poly(SBMA) hydrogel described above has as low protein adsorption and has low endothelial cell adhesion.

A crosslinked poly(CBMA) hydrogel was prepared as described in Example 8. The transparent hydrogel was prepared by adding CBMA monomer into tetraethylene glycol dimethacrylate (TEGDMA) followed by free radical polymerization initiated by sodium metabisulfite and ammonium persulfate. After polymerization, the gel was prepared according to the well-established procedure known in the art to remove residual chemicals. The hydrogel was punched into disks. The samples were incubated in fibronectin solution, and cultured with bovine aortic endothelial cells (BAECs). The results show that the poly(CBMA) hydrogel itself highly resists cell adhesion and can be readily modified to introduce proteins for cell adhesion.

In further aspects, the present invention provides methods for making low fouling surfaces. In one embodiment, the method includes (a) forming a radical initiator terminated monolayer on a substrate surface; and (b) polymerizing a monomer on the radical initiator terminated monolayer, wherein the monomer is a sulfobetaine or carboxybetaine. The monomer can be selected from the group consisting of sulfobetaine acrylates, sulfobetaine acrylamides, sulfobetaine vinyl compounds, sulfobetaine epoxides, and mixtures thereof, or can be selected from the group consisting of carboxybetaine acrylates, carboxybetaine acrylamides, carboxybetaine vinyl compounds, carboxybetaine epoxides, and mixtures thereof. In one embodiment, the monolayer is a self-assembled monolayer.

In one embodiment, the method includes (a) forming a hydroxy terminated monolayer on a substrate surface; (b) converting the hydroxy terminated monolayer to a radical initiator terminated monolayer; and (c) polymerizing a monomer on the radical initiator monolayer. The monomer can be a sulfobetaine or carboxybetaine, such as described above, and the monolayer can be a self-assembled monolayer.

In another embodiment, the method includes (a) forming a alkyl terminated monolayer on a substrate surface; (b) treating the alkyl terminated monolayer with a first diblock copolymer; and (c) treating the alkyl terminated monolayer with a second diblock copolymer. In one embodiment, the first diblock copolymer comprises a [hydrophobic monomer]$_1$-block-[hydrophilic monomer]$_m$ copolymer. In one embodiment, the first diblock copolymer comprises a [propylene oxide]$_1$-block-[sulfobetaine methacrylate]$_m$ copolymer. In one embodiment, the second diblock copolymer comprises a [hydrophobic monomer]$_1$-block-[hydrophilic monomer]$_n$ copolymer. In one embodiment, the second diblock copolymer comprises a [propylene oxide]$_1$-block-[sulfobetaine methacrylate]$_n$ copolymer. For these polymers 1 is an integer from 10-30, m is an integer from 10-100, n is an integer from 10-50, and m is greater than n.

In the methods for making super-low fouling surfaces, the surface is treated with a material that renders the surface super-low fouling, or a coating is formed on the surface that renders the surface super-low fouling.

In one method, a surface to be rendered super-low fouling is treated with a material (e.g., compound or polymer) that renders the surface super-low fouling. In the method, the surface is treated with an amount of the material to render the surface super-low fouling. The material effective to render the surface super-low fouling is applied to the surface and is associated with the surface through non-covalent interaction or through a bonding interaction (e.g., covalent, ionic, electrostatic, coordination complex formation).

In one embodiment of the method, the substrate surface is washed and cleaned, then soaked in a solution of super-low fouling coating materials for a period of time. The resulting substrate surface coated with super-low fouling materials is then washed and dried. The procedure can be repeated several times.

In another embodiment of the method, the substrate surface is washed and cleaned, then soaked in a solution of alkyl thiol. A first diblock copolymer solution is then flowed over the substrate surface coated with hydrophobic material (e.g., SAMs), followed by flushing with buffer solution to remove loosely adsorbed copolymers. A second diblock copolymer solution is then flowed over the substrate surface coated with the first diblock copolymer followed by flushing with buffer solution to remove loosely adsorbed copolymers.

In another method, the surface to be rendered super-low fouling is treated with one or more materials and processed to form a coating on the surface that renders the surface super-low fouling. In the method, a polymeric coating is grafted on the surface by the use of living polymerization techniques to grow polymer chains from surfaces in a controlled matter to provide a super-low fouling surface.

The grafting of polymeric materials on the substrate surface may be via any conventional polymerization method such as atom transfer radical polymerization (ATRP), reversible addition fragmentation chain transfer (RAFT) polymerization, and free radical polymerization. SAMs on substrate surfaces are an excellent platform for surface polymerization. Other hydrophobic materials (or hydrophobic surfaces) are also suitable. In one embodiment, polymers are grafted from self-assembly monolayers (SAMs) terminated with radical initiators. The substrate surface is coated with the SAMs terminated with radical initiator. Monomers are then polymerized onto the SAMs to form a layer of super-low fouling polymeric coating on the substrate surface. The atom transfer radical polymerization is initiated by the radical initiator at the end of the SAMs.

The super-low fouling surfaces and materials described herein may be used in marine applications such as ship hull coating, in biomedical field such as contact lenses, dental implants, drug delivery, implanted material, and coatings for in vivo sensors. Accordingly, in another aspect, the invention provides devices and materials having a surface or surfaces comprising a monolayer of a sulfobetaine or a carboxybetaine material, wherein the surface lacks a defect larger than about 1 nm$^2$, and wherein the surface has a fibrinogen adsorption less than about 30 ng/cm$^2$ including:

particles (e.g., nanoparticles) having surfaces modified to include the super-low fouling materials of the invention or prepared by the methods of the invention;

paints containing nanoparticles having surfaces modified to include the super-low fouling materials of the invention or prepared by the methods of the invention;

ship hulls coated with a paint containing nanoparticles having surfaces modified by the super-low fouling materials of the invention or prepared by the methods of the invention;

drug carriers having surfaces modified by the super-low fouling materials of the invention or prepared by the methods of the invention;

non-viral gene delivery systems having surfaces modified by the super-low fouling materials of the invention or prepared by the methods of the invention;

biosensors having surfaces modified by the super-low fouling materials of the invention or prepared by the methods of the invention;

devices for bioprocesses or bioseparations, such as membranes for microbial suspension, hormone separation, protein fractionation, cell separation, waste water treatment, oligosaccharide bioreactors, protein ultrafiltration, and diary processing having surfaces modified by the super-low fouling materials of the invention or prepared by the methods of the invention;

implantable sensors having surfaces modified by the super-low fouling materials of the invention or prepared by the methods of the invention;

subcutaneous sensors having surfaces modified by the super-low fouling materials of the invention or prepared by the methods of the invention;

implants, such as breast implants, cochlear implants, and dental implants having surfaces modified by the super-low fouling materials of the invention or prepared by the methods of the invention;

contact lens having surfaces modified by the super-low fouling materials of the invention or prepared by the methods of the invention;

tissue scaffolds having surfaces modified by the super-low fouling materials of the invention or prepared by the methods of the invention;

implantable medical devices, such as artificial joints, artificial heart valves, artificial blood vessels, pacemakers, left ventricular assist devices (LVAD), artery grafts, and stents having surfaces modified by the super-low fouling materials of the invention or prepared by the methods of the invention; and medical devices, such as ear drainage tubes, feeding tubes, glaucoma drainage tubes, hydrocephalous shunts, keratoprostheses, nerve guidance tubes, urinary catheters, tissue adhesives, wound dressings, and x-ray guides having surfaces modified by the super-low fouling materials of the invention or prepared by the methods of the invention.

The following examples are provided for the purpose of illustrating, not limiting, the invention.

EXAMPLES

Example 1

Representative Initiator SAM and Hydroxy-Terminated SAM: SAM Preparation and Initiator Immobilization SPR glass chips or silicon wafers were coated with an adhesion-promoting chromium layer (thickness 2 nm) and a surface plasmon active gold layer (48 nm) by electron beam evaporation under vacuum. Before SAM preparation, the substrates were washed with pure ethanol, cleaned under UV light, and washed with water and pure ethanol. SAMs were formed by soaking gold-coated substrates in pure ethanol solution of thiols at room temperature after careful cleaning. In this example, two SAMs were formed on the substrates: initiator ω-mercaptoundecyl bromoisobutyrate (1) SAM (initiator SAM or Br-SAM) and 11-mercapto-1-undecanol (2) SAM (OH-SAM) (See FIG. 1).

To prepare an initiator SAM on a gold surface and compare their effects on polymerization and protein adsorption, 1 solution with various concentrations and cleaning procedures were tested. If not specified, 1 mM 1 solution in pure ethanol was used to soak the substrates for 24 hours. The substrates were rinsed with pure ethanol followed by THF and dried in a stream of nitrogen.

For preparation of a hydroxyl-terminated SAM, the gold substrates were soaked in 1 mM 2 ethanol solution for 24 hours, then the substrates were rinsed with ethanol and dried in a stream of nitrogen. Gold substrates with a hydroxyl-terminated SAM were reacted with BIBB under nitrogen protection with anhydrous operation (FIG. 1). In this reaction, SAM-covered gold substrates were incubated in 25 mL dry THF with 2.1 mL pyridine (26.5 mmol), then 3.1 mL BIBB (25 mmol) was added dropwise with gently agitation. A white precipitate, likely pyridine hydrobromide, formed at the initial stage of reaction. After the reaction, the substrates were washed sequentially with THF, ethanol, and deionized water, and dried in a stream of nitrogen.

Example 2

Figure 2:
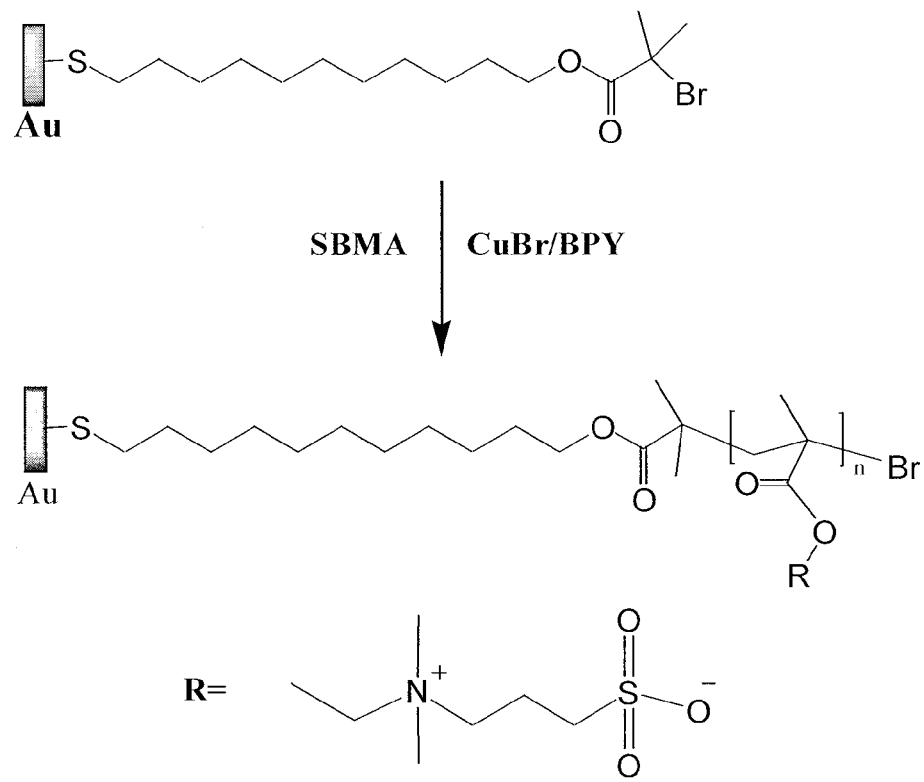
FIG. 2 is a schematic illustration of a method for preparing a surface coated with a representative poly(sulfobetaine)

The Grafting of Representative Sulfobetaine Polymers onto an Initiator-Coated Surface SBMA polymerization. CuBr and the substrate with immobilized initiators were placed in a reaction tube in a dry box under nitrogen protection. The tube sealed with rubber septum stoppers was taken out. Degassed solution (pure water and methanol in a 1:1 volume ratio) with SBMA and BPY were then transferred to the tube using syringe under nitrogen protection. After the reaction, the substrate was removed and rinsed with ethanol and water, and the samples were kept in water overnight. Usually rinsing with PBS buffer is also applied to remove unbound polymers before testing (FIG. 2).

SPR and protein adsorption. Protein adsorption was measured with a custom-built surface plasmon resonance (SPR) sensor, which is based on wavelength interrogation. A SPR chip was attached to the base of the prism, and optical contact was established using refractive index matching fluid (Cargille). A dual-channel flow cell with two independent parallel flow channels was used to contain liquid sample during experiments. A peristaltic pump (Ismatec) was utilized to deliver liquid sample to the two channels of the flow cell. Fibrinogen solution of 1.0 mg/mL in PBS (0.15 M, pH 7.4) was flowed over the surfaces at a flow rate of 0.05 mL/min.

A surface sensitive SPR detector was used to monitor protein-surface interactions in real time. In this example, wavelength shift was used to measure the change in surface concentration (mass per unit area). The amount of adsorbed fibrinogen on a $HS(CH_2)_{15}CH_3$ SAM (15 nm wavelength shift) was taken as a monolayer (ML). The wavelength shift induced due to protein adsorption on measured surfaces was normalized to be % ML by that on a $HS(CH_2)_{15}CH_3$ SAM. % ML can be larger than 100% if the amount of adsorbed protein on a analyzed surface is greater than that on a $HS(CH_2)_{15}CH_3$ SAM.

X-ray photoelectron spectroscopy (XPS). Gold-coated silicon chips were used for XPS analysis. The procedure for SAM preparation is the same as that for SPR chips. XPS analysis was performed using a Surface Science Instruments (SSI) S-Probe equipped with a monochromated Al Kα X-ray source. The energy of emitted electrons is measured with a hemispherical energy analyzer at pass energies ranging from 50 to 150 eV. Elemental composition present on the surface was identified from a survey scan. All data were collected at 55 from the surface normal take-off angle. The binding energy (BE) scale is referenced by setting the peak maximum in the C1s spectrum to 285.0 eV. Multiple samples were analyzed from each batch, and data were averaged. High-resolution C is spectra were fitted using a Shirley background subtraction and a series of Gaussian peaks. Data analysis software was from Service Physics, Inc.

Ellipsometry. Ellipsometry was performed using a spectroscopic ellipsometer (Sentech SE-850, GmbH). Sample preparation is the same as in XPS experiments. Five separate spots were measured at three different angles of incidence (50, 60 and 70 degrees) in the VIS region. The same batch of gold-coated chips was cleaned by UV-ozone cleaner for 20 minutes, washed with ethanol and Millipore water, and dried with nitrogen. The bare gold-coated chips were used as reference. The thicknesses of films studied were determined using the Cauchy layer model with an assumed refractive index of 1.45.

Tapping Mode Atomic Force Microscope (TM-AFM). The gold substrates for TM-AFM were prepared by the vapor deposition of gold onto freshly cleaved mica (Asheville-Schoonmaher Mica Co.) in a high-vacuum evaporator (BOC Edwards Auto306) at about $10^{-7}$ Torr. Mica substrates were preheated to 325° C. for 2 h by a radiator heater before deposition. Evaporation rates were 0.1-0.3 nm/s, and the final thickness of the gold film was about 200 nm. Gold-coated substrates were annealed in $H_2$ frame for 1 min before use. All TM-AFM images were acquired using a Nanoscope IV (Veeco, Calif.) AFM, equipped with E scanner. Si cantilevers (TESP, DI) with resonant frequencies of about 270 kHz, force constants of 20-100 N/m, and tip apex radii of 5-10 nm were used.

Example 3

Representative Well-Defined Diblock Copolymers Containing Sulfobetaines

Preparation of SBMA Block Copolymerization in Aqueous Solution. The controlled polymerization is achieved via the ATRP method (FIG. 1). The copolymerization of a diblock copolymer is a reversible redox process, through which a transition metal compound acts as a carrier of a halogen atom to sequentially link monomer to a monofunctional macro-initiator. PPO with a macro-initiator (PPO-Br) was synthesized by reacting monohydroxy-based poly(propylene glycol) with 2-bromoisobutyrylbromide in tetrahydrofuran. The product was purified by extraction with brine three times. For the polymerization of SBMA with 11200 molecular weight, SBMA (2.0 g, 6.77 mmol) was polymerized in 10 ml methanol using [SBMA]:[PPO-Br]:[CuBr]:[bpy]=50:1:1:2 under nitrogen at 20° C. After 24 hours, the resulting reaction solution was passed through an aluminum oxide column, precipitated into ethanol, and re-dissolved into water repeatedly to remove residue catalysts. After solvent evaporation, the copolymer was dried in a vacuum oven at room temperature to yield a white colored powder.

Characterization of the Copolymers. The structure of PPO-b-poly(SBMA) diblock copolymers was characterized by $^1$H nuclear magnetic resonance (NMR) spectra using a Bruker 300 MHz spectrometer and $D_2O$ as a solvent. A typical spectrum for $PO_{20}$-b-$SBMA_{35}$ is shown in FIG. 10. Results showed that a pure PPO-b-poly(SBMA) diblock copolymer was obtained. Molecular weights and molecular weight distributions of prepared diblock copolymers were determined by aqueous gel permeation chromatography (GPC), using 2 columns of ultrahydrogel 1000 and ultrahydrogel 250 (the range of molecular weight was from 586 Da to 885 kDa) connected to a model VE3580 viscotek differential refractometer detector from Waters. For GPC experiments, the flow rate was 0.7 ml/min and the column temperature was 25° C. The eluent was an aqueous solution composed of 0.1M $NaH_2PO_4$ and 0.1M $Na_2HPO_4$ at pH 8.0. PEG standards from Scientific Polymer Products (Ontario, N.Y.) were used for calibration. Typical aqueous data of the three synthesized PPO-b-poly(SBMA) copolymers from GPC are shown in FIG. 12.

Protein Adsorption Measurements by a Surface Plasmon Resonance (SPR) Sensor. A custom-built SPR biosensor based on wavelength interrogation with a dual-channel Teflon flow cell was used to monitor protein adsorption on surfaces coated with copolymers. In this example, optical glass substrates were used as sensor chips and coated with a 2 nm adhesion-promoting chromium layer and a 50 nm surface plasmon active gold layer by electron beam evaporation under vacuum. $CH_3$-terminated SAMs were formed by overnight soaking of UV ozone-cleaned, gold-coated substrates in a 1.0 mM ethanolic solution of $HS(CH_2)_8CH_3$. The modified chip was attached to the base of the prism and optical contact was established using refractive index matching fluid (Cargille). For protein adsorption measurements, the SPR was first stabilized with a 2 mM phosphate-buffered saline (PBS) solution. PPO-b-poly(SBMA) diblock copolymer solution was then flowed into the SPR cell for 20 min, followed by flushing with 2 mM PBS solution for 15 min to remove loosely adsorbed copolymers. 1.0 mg/mL protein was flowed for 20 min, followed by flushing with 2 mM PBS solution for 15 min. In this work, fibrinogen was used as a model system to evaluate protein adsorption on surfaces covered with physically adsorbed copolymers. All SPR experiments were conducted at room temperature (about 25° C.) and at a flow rate of 0.05 mL/min. The amount of protein adsorption is defined as the difference between the two baselines established before and after protein adsorption. FIG. 11 shows a typical SPR sensorgram for the adsorption of the copolymer A, followed by the in situ evaluation of fibrinogen adsorption.

Example 4

Representative Sulfobetaine Hydrogels

In this example, a poly(SBMA) hydrogel and its resistance to protein adsorption and cell adhesion is described. [2-(Methacryloyloxy)ethyl]dimethyl(3-sulfopropyl)ammonium hydroxide (SBMA) (1.0 g) was dissolved into 400 µL PBS buffer and mixed with 600 µL ethylene glycol and 20 µL tetra(ethylene glycol) diacrylate (TEGDA). Then, 50 µL 15% sodium metabisulfite solution and 50 µL 40% ammonium persulfate solution were added. The homogenous mixture was poured into two sterilized glass slides separated by a Teflon spacer. Clamps were applied to the edges of the glasses to ensure a perfect sealing. The obtained film was cured at 37° C. over night and the film was extensively soaked with DI water for 24 hours, 70% ethanol for 24 hours, and DI water before being perforated to disks. The hydrogel disk was kept in DI water.

The poly(SBMA) hydrogel described above has as low protein adsorption as poly(HEMA) and has low endothelial cell adhesion (see FIGS. 30A-30D).

Example 5

Representative PolySBMA Coatings

SBMA (1.22 g) and AIBN (0.05 g) were dissolved in a methanol solvent (50 mL) and the solution was purged with nitrogen for 30 minutes. The reaction mixture was then stirred at 55° C. under a nitrogen atmosphere for 1 hour. Then, lauryl methacrylate (1.75 g) in 100 mL isopropanol was added and the reaction mixture was kept stirring at 60° C. under a nitrogen atmosphere for 5 hours. The product was filtered and dispersed in xylene with a concentration of 99 g/L. An enzyme-linked immunosorbent assay (ELISA) showed a greater than 90% reducing in protein adsorption on polySBMA coated surfaces (FIG. 18) Marine biofouling assays showed that polySBMA coatings significantly reduced settling of marine microorganisms (see FIGS. 19-21).

The polySBMA-based polymers can be added into epoxy-based paint to reduce biofouling (polySBMA/epoxy coating). In a representative formulation, the polySBMA-based polymer dispersion is the polySBMA-based polymer described above in xylene at concentration of 99 g/L and the epoxy resin is 70-80% epoxy solution. $TiO_2$, $Fe_2O_3$, and carbon black are suitable as pigments, and an organo-clay structuring agent, silica thixotropic agent can also bee added. The crosslinker is a polyamide that reacts with epoxy resin at ambient temperature. The liquid nonfouling coating is coated on epoxy primer substrates by brush or spray. ELISA shows greater than 90% reduction in fibrinogen adsorption. FIGS. 19-21 show very low Ulva zoospores settlement, very low sporeling growth, and very weak sporeling strength of attachment. FIG. 21 shows low juvenile *H. elegans* settlement. These results show that poly(SBMA)/epoxy coatings significantly reduced the biofouling of marine microorganisms.

Example 6

Preparation and Characterization of Representative IPNs Containing Sulfobetaine

IPN films containing SPU and poly(SBMA). As shown in FIG. 3, the SPU film of 100 μm thickness was prepared via the solvent evaporation method. A SPU solution was first prepared from 5.0 wt % SPU powder dissolved in dimethylacetamide (DMA). After the solution was cast onto the glass slide, the slide was heated to 35° C. to dry the film. After the bulk of the solvent evaporated overnight, the SPU film was placed into a water bath at 60° C. for 24 hours to remove trace DMAc and was then dried in a vacuum oven for 3 days. The SPU film was then immersed in an incubation solution containing SBMA monomer, EHMA monomer, GDGDA crosslinker and photoinitiators for 24 hours at 20° C. Solvent polarity was varied by using a mixed solvent containing water, methanol, ethanol or isopropanol with decreasing polarity in the incubation solution.

The total concentration of the incubation solution (or incubation concentration) was adjusted from 0.1 to 3.0 mol/L. SBMA monomer ratio (mol %) is defined as the moles of SBMA monomer divided by the total moles of SBMA and EHMA monomers in the incubation solution. In this example, the SBMA monomer ratio was adjusted between 0 and 100 mol % to optimize preparation conditions for IPNs while GDGDA was fixed at $1.0 \times 10^{-2}$ mol/L. To eliminate side reactions, photoinitiators (e.g., camphorquinone and ethyl 4-(N,N-dimethylamino) benzoate) at $1.0 \times 10^{-2}$ mol/L were added into the incubation solution in the presence of nitrogen in the dark. For photo-polymerization, the SPU film was placed between two mica sheets was irradiated with visible light ($\lambda$=400-500 nm). After irradiation for 120 min at 20° C., the mica sheets were removed from the IPN film in water, unreacted monomers were extracted by soaking in ethanol and methanol alternatively several times, and the IPN film was dried in a vacuum oven. The chemical composition depth profile of the IPN film was characterized using a Raman Microspectrometer, which combines a Renishaw in Via Raman Spectroscope and an inverted Leica DMIRBE Microscope. A 785 nm laser was used as an excitation source and was focused through a 40× objective to about 1 μm light spot on the sample surface. Scattered light from the sample surface was collected through the same objective. Raleigh scattering light was cut off by a holographic notch filter. Raman light was passed through an entrance slit with a 65 μm opening and a 1200 1/mm diffraction grating and measured by a CCD camera. For the distribution depth profile of SBMA units within the SPU film, Raman spectra were acquired from the focal planes at the surface of the film and into the film over 20 μm increments.

Evaluation of protein adsorption using an enzyme-linked immunosorbent assay (ELISA). The adsorption of human fibrinogen (Fg) onto the IPN films was evaluated using ELISA according to the standard protocol as described briefly below. First, IPN films of 12 mm in surface area were placed in individual wells of a 24-well tissue culture plate and each well was incubated with 500 μl of PBS at room temperature. Then, the IPN films were soaked in 500 μl of 1 mg/ml Fg in PBS solution. After 90 min of incubation at 37° C., the films were rinsed 5 times with 500 μl of PBS and then incubated in bovine serum albumin (BSA) for 90 min at 37° C. to block the areas unoccupied by Fg. The IPN films were rinsed with PBS 5 times again, transferred to a new plate, and incubated in a 500 μl PBS solution containing 5.5 μl horse radish peroxidase (HRP) conjugated anti-Fg (US Biological) for 30 min at 37° C. The samples were rinsed 5 times with 500 μl of PBS and transferred into clean wells, followed by the addition of 500 μl of 0.1 M citrate-phosphate buffer (pH 5.0) containing 1 mg/ml chromogen of o-phenylenediamine (ODP) and 0.03% hydrogen peroxide. After incubation for 20 min at 37° C., the enzyme-induced color reaction was stopped by adding 500 μl of 1M $H_2SO_4$ to the solution in each well and finally the absorbance of light intensity at 490 nm was determined by a microplate reader. Protein adsorption on the IPN samples was normalized with respect to that on the polystyrene (PS) plate as a reference. The amount of adsorbed proteins obtained could be higher than the actual amount due to the presence of multiple binding sites on the polyclonal anti-human Fg used.

Example 7

Representative Nonfouling Carboxybetaine Coating

Human plasma fibrinogen and chicken egg white lysozyme were purchased from Sigma-Aldrich (Milwaukee, Wis.). Human plasma fibronectin was purchased from Chemicon International (Temecula, Calif.). Human chorionic gonadotropin (hCG) and its monoclonal mouse antibody (isotype IgG1) were purchased from Scripps Laboratories (San Diego, Calif.). 2-(N,N'-dimethylamino)ethyl methacrylate (DMAEM, 98%), β-propiolactone (95%), copper (I) bromide (99.999%), bromoisobutyryl bromide (98%), 11-mercapto-1-undecanol (97%), 2,2'-bipyridine (BPY 99%) and tetrahydrofuran (THF HPLC grade), N-hydroxysuccinimide (NHS) and 1-ethyl-3-(3-dimethylaminopropyl)-carbodiimide (EDC), were purchased from Sigma-Aldrich (Milwaukee, Wis.). Phosphate buffer saline (PBS, 0.01 M phosphate, 0.138 M sodium chloride, 0.0027 M potassium chloride, pH 7.4) were purchased from Sigma Chemical Co. Ethanol (absolute 200 proof) was purchased from AAPER Alcohol and Chemical Co. Water used in experiments was purified using a Millipore water purification system with a minimum resistivity of 18.0 MΩcm. THF for reactions and washings were dried by sodium before use.

CBMA synthesis. A carboxybetaine methacrylate (CBMA) monomer, 2-carboxy-N,N-dimethyl-N-(2'-methacryloyloxyethyl)ethanaminium inner salt, was synthesized by reaction of 2-(N,N'-dimethylamino)ethyl methacrylate (DMAEM, 98%) with β-propiolactone (95%). 0.87 g (12 mmol) β-Propiolactone in 10 mL dried acetone was added dropwise to a solution of 1.57 g (10 mmol) DMAEM dissolved in 50 mL dried acetone. The reaction was stirred under nitrogen protection at 15° C. for about 5 hours. The white precipitate was washed with 50 mL dried acetone and 100 mL dried ether. The product was dried under reduced pressure to get CBMA monomer. The monomer was kept at 2-8° C. before the polymerization. Yield: 91%. $^1$H NMR was recorded on a Bruker AV300 spectrometer using deuterated water as solvent (FIG. 31).

Surface initiated polymerization on a SPR sensor. SPR glass chips were coated with an adhesion-promoting chromium layer (2 nm) and a surface plasmon active gold layer (48 nm) by electron beam evaporation under vacuum. Before SAM preparation, the substrates were washed with pure ethanol, cleaned under UV light, and washed with water and pure ethanol. The initiator SAMs were formed by soaking gold-coated substrates in a pure ethanol solution of 1 mM ω-mercaptoundecyl bromoisobutyrate at room temperature for 24 hours. Before the polymerization, the substrates were rinsed with pure ethanol, followed by THF and dried in a stream of nitrogen.

CuBr and the substrate with immobilized initiators were placed in a reaction tube in a dry box under nitrogen protection. The tube sealed with rubber septum stoppers was taken out. Degassed solution (pure water and methanol in a 1:1 volume ratio) with CBMA and BPY was then transferred to the tube using syringe under nitrogen protection. After the reaction, the substrate was removed and rinsed with ethanol and water, and the samples were kept in water overnight. Rinsing with PBS buffer is also applied to remove unbound polymers before testing. For a typical polymerization, the substrate was reacted with 7.5 mmol CBMA, 2 mmol BPY and 1 mmol CuBr in 25 mL $CH_3OH/H_2O$ (1:1 volume ratio) for 1 hour under nitrogen protection. After a typical ATRP polymerization, homogenous carboxybetaine polymer brushes were grafted on the gold surface of a SPR sensor. The thickness of the polymer layer is around 10-15 nm measured by ellipsometry.

SPR analysis and protein adsorption. Protein adsorption was measured with a custom-built surface plasmon resonance (SPR) sensor, which is based on wavelength interrogation. A SPR chip was attached to the base of the prism, and optical contact was established using refractive index matching fluid (Cargille). A four-channel flow cell with four independent parallel flow channels was used to contain liquid sample during experiments. A peristaltic pump (Ismatec) was utilized to deliver liquid sample to the four channels of the flow cell. A fibrinogen solution of 1.0 mg/mL in PBS was flowed over the sensor surface at a flow rate of 0.05 mL/min. A SPR detector was used to monitor protein-surface interactions in real time. In this study, wavelength shift was used to measure the change in surface concentration (or mass per unit area).

Ellipsometry. Ellipsometry was performed using a spectroscopic ellipsometer (Sentech SE-850, GmbH). Sample preparation is the same as in XPS experiments. Five separate spots were measured at three different angles of incidence (50, 60 and 70 degrees) in the VIS region. The same batch of gold-coated chips was cleaned by UV-ozone cleaner for 20 min, washed with ethanol and Millipore water, and dried with nitrogen. The bare gold-coated chips were used as a reference. The thicknesses of films studied were determined using the Cauchy layer model with an assumed refractive index of 1.45.

Example 8

Representative Carboxybetaine Hydrogels

In this example, a poly(CBMA) hydrogel and its resistance to protein adsorption and cell adhesion is described. A CBMA hydrogel was prepared by adding 2.7 M CBMA monomer into tetraethylene glycol dimethacrylate (TEGDMA) (5.9 mol %) and through free radical polymerization initiated by sodium metabisulfite (1.2 mol %) and ammonium persulfate (2.6 mol %) in a mixed solution (ethylene glycol/ethanol/$H_2O$=3:1:1 volume ratio). The reaction was carried out at 37° C. for 12 hours. After polymerization, the gel was immersed in a large amount of DI water for three days and water was changed every day to remove residual chemicals. The gel was then equilibrated in sterilized PBS solution, which was changed every day for another two days. Hydrogels were punched into disks with a diameter of 5 mm and stored in sterilized buffer solution before use.

The hydrogel disks were immersed into dioxane of 2 mg/ml NHS and 2 mg/ml EDC in dioxane/water (14:1) mixture for 1 hour at room temperature. The hydrogel disks shrank during the soaking with the dioxane/water solution. The disks were removed from the solution, soaked in Millipore water to swell them back, rinsed with Millipore water, and soaked in PBS buffer for another 30 min. The samples were immersed in a 100 μg/mL fibronectin solution at 4° C. for 24 hours.

Bovine aortic endothelial cells (BAECs) with a density of $1\times10^5$ cells/mL were seeded on the gel surface. Cell-loaded samples were cultured at 37° C. in a humidified atmosphere of 5% $CO_2$. The cell morphology was observed between 2 hours and 3 days of cultivation.

Example 9

Representative Poly(SBMA) or Poly(CBMA) Coatings on Glass Surface

Normal glass substrates were put into 20 wt % NaOH solution overnight, washed with DI water and dried in the air. The cleaned substrates were immersed in 20 mL solution containing 0.5 g 2-bromo-2-methyl-N-3-[(trimethoxysilyl)propyl]-propanamide. After 2 hours, the substrates were removed from the dipping solution and slightly rinsed with ethanol. The substrates were kept at 100° C. for 5 hours in a vacuum oven vacuumed by an oil-free vacuum pump.

CuBr (143 mg, 1.0 mmol) and two substrates with immobilized initiators were placed in a 50 mL flask in a dry box under nitrogen protection and sealed with rubber septum stoppers before removal from the dry box. Degassed solution (pure water and methanol in a 1:1 volume ratio, 10 mL) with SBMA (1.06 g, 3.8 mmol) or CBMA (874 mg, 3.8 mmol) and 2,2'-bipyridine (156 mg, 1 mmol) were then transferred to the flask using syringe under nitrogen protection. After the reaction for one hour, the substrates were removed and rinsed with ethanol, PBS buffer and water, and the samples were kept in water overnight. The substrates were dried in a stream of nitrogen before use.

An enzyme-linked immunosorbent assay (ELISA) showed a significant reducing in protein adsorption on polySBMA or polyCBMA grafted surfaces (see FIG. 18). The adsorbed fibrinogen on polymer grafted glass samples is less than 4% of that on normal glass samples. No algae spore or algae adhesion was found on the polySBMA grafted surfaces under a 6 hours incubation with green algae spores while the control glass sample was covered with green algae (see FIG. 20).

While illustrative embodiments have been illustrated and described, it will be appreciated that various changes can be made therein without departing from the spirit and scope of the invention.

The embodiments of the invention in which an exclusive property or privilege is claimed are defined as follows:

1. A surface having a layer of carboxybetaine polymers coupled thereto, wherein the density of the carboxybetaine polymers in the layer provides a surface having a fibrinogen adsorption of less than about 30 ng/cm$^2$ in a fibrinogen binding assay when the surface is incubated at 37° C. for 90 minutes with a 1.0 mg/mL fibrinogen solution (0.15 M phosphate buffered saline at pH 7.4).

2. The surface of claim 1, wherein the carboxybetaine polymers are prepared from one or more monomers selected from the group consisting of a carboxybetaine acrylate, a carboxybetaine acrylamide, a carboxybetaine methacrylate, and mixtures thereof.

3. The surface of claim 1, wherein the layer of carboxybetaine polymers comprises an interpenetrating carboxybetaine polymer network.

4. The surface of claim 3, wherein the interpenetrating carboxybetaine polymer network further comprises one or more polymers selected from the group consisting of a polyurethane, a silicone, a polyester, a polyethylene, and a polyamide.

5. The surface of claim 1, wherein the layer of carboxybetaine polymers comprises a carboxybetaine copolymer.

6. The surface of claim 1, wherein the layer comprises carboxybetaine polymers covalently attached to a substrate surface.

7. The surface of claim 1 on all or part of a medical device.

8. The surface of claim 7, wherein the device is selected from the group consisting of an implantable device, a drug delivery device, a sensor, a bioprocessing device, a bioseparations device, an implant, and a tissue engineering scaffold.

9. The surface of claim 7, wherein the device is a contact lens.

10. The surface of claim 1 on all or part of a particle.

11. The surface of claim 1 on all or part of a membrane.

12. The surface of claim 1 on all or part of a marine device.

13. The surface of claim 12, wherein the marine device is a hull.

14. The surface of claim 1, wherein the fibrinogen adsorption is less than 10 ng/cm$^2$.

15. The surface of claim 1, wherein the fibrinogen adsorption is less than 5 ng/cm$^2$.

16. The surface of claim 1, wherein the fibrinogen adsorption is less than 0.3 ng/cm$^2$.

17. The surface of claim 1, wherein the carboxybetaine polymers are prepared from one or more monomers selected from the group consisting of a carboxybetaine vinyl compound, a carboxybetaine epoxide, and mixtures thereof.

18. A substrate comprising a surface having a layer of carboxybetaine polymers grafted from the surface, wherein the density of the carboxybetaine polymers in the layer provides a surface having a fibrinogen adsorption of less than about 30 ng/cm$^2$ in a fibrinogen binding assay when the surface is incubated at 37° C. for 90 minutes with a 1.0 mg/mL fibrinogen solution (0.15 M phosphate buffered saline at pH 7.4).

19. The substrate of claim 18, wherein the carboxybetaine polymers are prepared from one or more monomers selected from the group consisting of a carboxybetaine acrylate, a carboxybetaine acrylamide, a carboxybetaine methacrylate, and mixtures thereof.

20. The substrate of claim 18, wherein the layer of carboxybetaine polymers comprises a carboxybetaine copolymer.

21. The substrate of claim 18, wherein the fibrinogen adsorption is less than 10 ng/cm$^2$.

22. The substrate of claim 18, wherein the fibrinogen adsorption is less than 5 ng/cm$^2$.

23. The substrate of claim 18, wherein the fibrinogen adsorption is less than 0.3 ng/cm$^2$.

24. The substrate of claim 18 on or forming all or part of a particle.

25. The substrate of claim 18 on or forming all or part of a drug delivery system.

26. The substrate of claim 18 on or forming all or part of a biosensor.

27. The substrate of claim 18 on or forming all or part of a bioprocesses or bioseparations membrane.

28. The substrate of claim 18 on or forming all or part of an implantable or subcutaneous sensor.

29. The substrate of claim 18 on or forming all or part of an implant.

30. The substrate of claim 18 on or forming all or part of a contact lens.

31. The substrate of claim 18 on or forming all or part of a tissue scaffold.

32. The substrate of claim 18 on or forming all or part of a medical device or an implantable medical device.

33. The substrate of claim 18 on or forming all or part of a marine device.

34. The substrate of claim 18, wherein the carboxybetaine polymers are prepared from one or more monomers selected from the group consisting of a carboxybetaine vinyl compound, a carboxybetaine epoxide, and mixtures thereof.

* * * * *